(12) United States Patent
Kalmick et al.

(10) Patent No.: US 7,668,863 B2
(45) Date of Patent: Feb. 23, 2010

(54) METHOD AND APPARATUS FOR MANAGEMENT OF COURT SCHEDULES

(75) Inventors: David J. Kalmick, Encino, CA (US);
Ricky J. Rains, Los Angeles, CA (US);
Alexander J. Manners, Hermosa Beach, CA (US)

(73) Assignee: Compulaw, LLC, Los Angeles, CA (US)

( * ) Notice: Subject to any disclaimer, the term of this patent is extended or adjusted under 35 U.S.C. 154(b) by 170 days.

(21) Appl. No.: 10/201,598

(22) Filed: Jul. 22, 2002

(65) Prior Publication Data
US 2003/0204430 A1 Oct. 30, 2003

Related U.S. Application Data

(60) Provisional application No. 60/306,677, filed on Jul. 20, 2001.

(51) Int. Cl.
*G06F 7/00* (2006.01)
*G06F 15/16* (2006.01)

(52) U.S. Cl. .................. 707/104.1; 707/10; 709/203

(58) Field of Classification Search ............... 707/1–10, 707/100–102, 104.1, 200–201, 20; 709/203, 709/217–224; 700/90; 705/8, 9, 53
See application file for complete search history.

(56) References Cited

U.S. PATENT DOCUMENTS

| | | | | |
|---|---|---|---|---|
| 4,924,387 A | | 5/1990 | Jappesen | |
| 5,175,681 A | * | 12/1992 | Iwai et al. ...................... 705/9 |
| 5,329,447 A | * | 7/1994 | Leedom, Jr. ................... 705/9 |
| 5,459,656 A | * | 10/1995 | Fields et al. ................... 705/7 |
| 5,708,827 A | * | 1/1998 | Kaneko et al. .............. 715/219 |
| 5,740,050 A | * | 4/1998 | Ward, II ...................... 705/418 |
| 5,842,009 A | * | 11/1998 | Borovoy et al. ................ 707/1 |
| 5,884,305 A | * | 3/1999 | Kleinberg et al. .............. 707/6 |
| 6,044,219 A | * | 3/2000 | Lips .......................... 717/106 |
| 6,182,078 B1 | | 1/2001 | Whitmyer, Jr. |
| 6,188,329 B1 | * | 2/2001 | Glier et al. ............... 707/104.1 |
| 6,275,812 B1 | * | 8/2001 | Haq et al. ..................... 705/11 |

(Continued)

OTHER PUBLICATIONS

Sugiura, Schedule reminder system, US Pub. No. 2001/0051935 A1.*

(Continued)

*Primary Examiner*—Miranda Le
(74) *Attorney, Agent, or Firm*—Christie, Parker & Hale, LLP

(57) ABSTRACT

A method and apparatus for generating court calendars. A court date server is coupled to a database of court rules for generation of court dates. A user accesses the court date server via a communications network and submits event and jurisdiction data to the court date server. The court date server uses the event data and the jurisdiction data to generate a court calendar of event dates that is transmitted to the user. In one embodiment of a court date server, the court date server is coupled to a user database. The court date server stores the court calendar in the user database for later retrieval and use by the user. In addition, the court date server uses the stored court calendar to generate court date reminders that are sent to the user and to send notifications to the user when court rules are modified that affect the user's already calculated court dates.

25 Claims, 27 Drawing Sheets

U.S. PATENT DOCUMENTS

| | | | |
|---|---|---|---|
| 6,341,279 B1* | 1/2002 | Nye | 707/3 |
| 6,363,361 B1* | 3/2002 | Lundberg | 705/40 |
| 6,549,894 B1* | 4/2003 | Simpson et al. | 707/1 |
| 6,594,637 B1* | 7/2003 | Furukawa et al. | 705/9 |
| 6,622,128 B1* | 9/2003 | Bedell et al. | 705/30 |
| 6,629,097 B1 | 9/2003 | Keith | |
| 6,640,213 B1* | 10/2003 | Carp et al. | 705/10 |
| 6,647,361 B1 | 11/2003 | Laird et al. | |
| 6,668,255 B2 | 12/2003 | Mielenhausen | |
| 6,694,315 B1 | 2/2004 | Grow | |
| 6,754,663 B1 | 6/2004 | Small et al. | |
| 6,785,868 B1* | 8/2004 | Raff | 715/530 |
| 6,839,707 B2* | 1/2005 | Lee et al. | 707/8 |
| 6,859,806 B1* | 2/2005 | Kamarei et al. | 707/10 |
| 6,898,569 B1* | 5/2005 | Bansal et al. | 705/9 |
| 6,918,089 B2* | 7/2005 | Uchida et al. | 715/751 |
| 6,925,603 B1* | 8/2005 | Naito et al. | 715/733 |
| 6,952,732 B2* | 10/2005 | Nourbakhsh et al. | 709/226 |
| 6,970,842 B1* | 11/2005 | Ashby | 705/38 |
| 6,993,502 B1 | 1/2006 | Gryglewicz et al. | |
| 7,003,316 B1 | 2/2006 | Elias et al. | |
| 7,016,852 B1* | 3/2006 | Lee | 705/1 |
| 7,028,259 B1* | 4/2006 | Jacobson | 715/531 |
| 7,146,333 B2 | 12/2006 | Hamer et al. | |
| 7,171,416 B2* | 1/2007 | Kalmick et al. | 707/10 |
| 7,240,836 B2 | 7/2007 | Vrotsos et al. | |
| 7,302,433 B2* | 11/2007 | Kalmick et al. | 707/10 |
| 7,363,054 B2 | 4/2008 | Elias et al. | |
| 2002/0002558 A1* | 1/2002 | Krause | 707/104.1 |
| 2002/0059076 A1* | 5/2002 | Grainger et al. | 705/1 |
| 2002/0184234 A1* | 12/2002 | Lundberg | 707/104.1 |
| 2005/0187807 A1 | 8/2005 | Delatte et al. | |
| 2006/0111992 A1 | 5/2006 | Coble | |
| 2006/0139909 A1 | 6/2006 | Leanza | |

OTHER PUBLICATIONS

Jack R. Buchanan; Richard D. Fennell; Hanan Samet; A Database management System for the Federal Courts, ACM Transactions on Database Systems, vol. 9, No. 1, Mar. 1984, pp. 72-88.*

U.S. Appl. No. 10/201,563, Entitled Method and Apparatus for Court Date Calculation Engine, filed Jul. 22, 2002 in USPTO.

*Advanced/Network Docket*, Compulaw Ltd., © 1994 Compulaw Ltd. Sections 1-6, Including Appendices A-J.

Allowed claims in related U.S. Appl. No. 11/941,025, entitled: Method and Apparatus for Updating Rules and Transmitting Change Notifications, 4 pgs.

* cited by examiner

Matter Management

You have access to your matters from this page Simply tell us what criteria to use to find the matter or matters you wish to find Leave all filter fields blank if you wish to retrieve all your matters

Filter Criteria

Search for matters by providing all or part of a matter name

[_____] Help — 400

- ⦿ Matter names that begin with the specified text
- ○ Matter names that contain the specified text
- ○ Matter names that match the specified text exactly — 402

— 404

Search for matters of a specific type

[_____ List] — 406

Search for matters opened on a certain date or range of dates

[MM/DD/YYYY] thru [MM/DD/YYYY] — 408

Search for matters that have been closed on a certain date or range of dates

[MM/DD/YYYY] thru [MM/DD/YYYY] — 410

Set this option if you want to include matters that have been marked "Inactive"

☐ Include inactive matters? — 412

How many matters per page would you like to show in the matter list?

[10 ▼] — 414

[< Back] [Find] — 416 [Add a New Matter] [Matter Recovery] — 418

FIG. 4

Matter Information           ID: 123456789

Enter information about a matter into the fields on this page. Click the "Submit" button when finished to save your changes.

Enter the name of the matter here: —602

Enter the Docket ID for the matter here: —606

You can assign a "type" to a matter which allows you to group like
Enter the "type" (up to 10 characters) code or click "List" to select from a list. —604

List

Enter the date the matter was opened here:
| MM/DD/YYYY | —606

Enter the date the matter was closed here:
| MM/DD/YYYY | —610

Select the default jurisdiction for this matter. The jurisdiction you provide here is used as the default jurisdiction when scheduling dates for this matter (you must use the "List" link to set this field): —612

List —614

Making a matter "Inactive" prevents you from accidentally adding new dates for the matter:

☐ Inactive —616      —622

[<Back] [Submit] [Events] [Delete]
—624    —620

Event Management

You have access to all your court dates (events) from this page. Simply tell us what criteria to use to find the events you wish to see. You must provide information for at least one of the fields below.

Filter Criteria

Search for events by providing all or part of a matter name.

[_____] [Beginning with ▼]

Search for events for matters of a specific matter type

[_____] List

Search for events whose due date falls with in this range of dates and times:

[MM/DD/YYYY] at [HH MMap] thru [MM/DD/YYYY] at [HH MMap]

Search for events added within this range of dates and times:

[MM/DD/YYYY] at [HH:MMap] thru [MM/DD/YYYY] at [HH MMap]

Search for events last changed within this range of dates and times:

[MM/DD/YYYY] at [HH MMap] thru [MM/DD/YYYY] at [HH.MMap]

Search for a specific event using it's unique ID:

[_____]

Search for events that use a certain date calculation formula:

[_____]

Search for events with a word or phrase in the formula description

[_____] [Beginning with ▼]

Search for events with a word or phrase in the note field

[_____] [Beginning with ▼]

☐ Include completed events?
☐ Include deleted events?
How many events per page would you like to show in the event list?

[10 ▼]

[< Back] [Find] [Add a New Event]

FIG. 8

Add Court Dates

Use this form to enter the information used to calculate the court dates for a particular deadline. Simply follow the steps below and click the "Submit" button when finished.

| Date Information |

Step 1: Select a matter for which the dates are to be scheduled. Click the "List" link next to the field for a list of available matters.

┌─────── 1004
│                                                             List  ┌─1002

Step 2: Select the jurisdiction in which the event is being scheduled. Click the "Expert" link next to the field for a list of available jurisdictions.
─────────────────1008
                                        Expert   ─1006

Step 3: Select the event that you want to schedule. Click the "Expert" link next to the field for a list of available events for the jurisdiction you selected.
─────────────1012
                                        Expert   ┌─1010

Step 4: Enter the due date and time of the event using the two fields below. Click the button
1014—next to the field for a selection list.
                    ┌─1018        ┌─1016
                    Calendar      Time    ┌─1020

Step 5: Use this field to enter the number of days before the event on which you wish receive a reminder e-mail.    ┌─1024 to 1022─┐
        Apply to all scheduled       ┌─1028
        dates?                       Apply to all scheduled
Step 6: Enter a note that will be attached to this       dates?
                    event.

1026 ─┐

Step 7: Click the "Schedule" button to schedule your court dates. Click the "Cancel" button to cancel the scheduling process.

Schedule  |  Cancel
                │          │
        └─1000  └─1030     └─1032

FIG. 10

View/Edit Date

Use this form to enter the information CompuLaw needs to calculate the court dates for a particular deadline Simply follow the steps below and click the "Submit" button when finished

Audit Information

Record ID 123456789                                    Formula ID CA LA-FT-96
Added by <user name> on <MM/DD/YYYY> at <HH MMap>
Changed by <user name> on <MM/DD/YYYY> at <HH MMap>

Date Information

| | |
|---|---|
| Matter name | Acme Refrigeration vs. Elmer Fudd |
| Jurisdiction | List by State->California->Southern-> |
| Event | Trial Date |
| Authority | The dates authority is shown here |
| Event description | The description of the formula used to schedule this date is shown here |
| | The formula description will most likely be multiple lines |

1104 — Due date [MM/DD/YYYY]     Calendar     116 / 1112 — Complete
1106 — Time. [HH MMap]     Time / 1114 — Don't change
                                    1118
Reminder [99]     (Reminder e-mail will be sent on MM/DD/YYYY)
1108 ——— 1120                                                      1110

This is the user provided note

1122

Change | Cancel

Date Generation Varification

Below is a summary of the deadlines that you have selected for generation. 99 deadlines will be generated and your account will be charged $999 Click "Submit" to generate the dates or "Cancel" to cancel the process --- Schedule Using ---

Jurisdiction: Southern California->Los Angeles County->Civil Litigation->Limited Jurisdiction Case
Event: Settlement conference
Date: 03/27/2002 at 3:00pm --- Billing Information --- of deadlines: 99 — 1400
Charges: $999
— 1402

Clicking "Submit" bills your account then the list of dates is displayed. You will also be sent an e-mail containing the generated dates to the following e-mail address:
bobsmith@acme.com

[Accept] [Cancel] — 1406

Edit/Verify Events

Below are a list of the dates effected by the change or addition of dates for the matter.

General Information

Matter name: Acme Refrigeration vs. Elmer Fudd
Jurisdiction: List by State->California->Southern->...
Group ID: 1234567

Events  << Prev 1 2 3 4 5 Next >>

| A/C | Due | Time | Matter/Authority/Description/Note | |
|---|---|---|---|---|
| Added | MM/DD/YYYY | 12.00a-12.00p | Acme Refrigeration Inc<br>CCP 1985 3(d), 1985.6(d), 2020(d)<br>LAST COURT DAY TO ISSUE SUBPOENA DUCES TECUM FOR PERSONAL OR EMPLOYMENT RECORDS<br>This is the user note field containing the first 128 characters of the user provided note | Delete<br>Note |
| Changed | MM/DD/YYYY | 12.00a-12.00p | Acme Refrigeration Inc.<br>CCP 109.1(a)<br>THE COMPULAW PROVIDED FORMULA DESCRIPTION WOULD BE SHOWN HERE.<br>This is the user note field containing the first 128 characters of the user provided note. | Skip<br>Note |

[Accept]  [Cancel]  [Print]

FIG. 16

Event Maintenance Log

This list contains the log entries made by our Event Maintenance process for any changes made to any of your dates. To see the detail of the changes made, click the "Details" link next to the log entry.

| Log Entries | | | | << Prev 1 2 3 4 5 Next >> | |
|---|---|---|---|---|---|
| Notified on | Notifications | Log ID | Changes | Confirmed? | |
| MM/DD/YYYY at HH:MMap | 9 | 999999999 | 99 | Yes\|No | Details |
| MM/DD/YYYY at HH:MMap | 9 | 999999999 | 99 | Yes\|No | Details |
| MM/DD/YYYY at HH:MMap | 9 | 999999999 | 99 | Yes\|No | Details |
| MM/DD/YYYY at HH:MMap | 9 | 999999999 | 99 | Yes\|No | Details |
| MM/DD/YYYY at HH:MMap | 9 | 999999999 | 99 | Yes\|No | Details |
| MM/DD/YYYY at HH:MMap | 9 | 999999999 | 99 | Yes\|No | Details |
| MM/DD/YYYY at HH:MMap | 9 | 999999999 | 99 | Yes\|No | Details |

Back

FIG. 17

Event Maintenance
Detail
Below is a list of the changes made by an Event Maintenance to your dates for log entry
999999999. —1800

| Detail | <<Prev 1 2 3 4 5 Next>> |

| Event ID | Changes |
|---|---|
| 999999999 | Date changed from MM/DD/YYYY to MM/DD/YYYY —1802 |
| 999999999 | Time changed from HH.MMap to HH MMap |
| 999999999 | The formula description has been changed |
| 999999999 | Unable to change date because the date was changed form its originally calculated date |

—1804

[<Back]

FIG. 18

METHOD AND APPARATUS FOR MANAGEMENT OF COURT SCHEDULES

CROSS-REFERENCE TO RELATED APPLICATION

This application claims the benefit of U.S. Provisional Application No. 60/306,677 filed on Jul. 20, 2001, which is hereby incorporated by reference as if set forth in full herein.

BACKGROUND OF THE INVENTION

This invention relates generally to the field of docket scheduling for the legal profession and more specifically to scheduling court deadlines.

The timing between a sequence of events of most legal matters, such as a lawsuit, are defined by court rules originating from statues, by local court rules originating in a local jurisdiction, and by individual court rules created by individual judges. These court rules may vary by the type of legal matter, by mutual consent of the parties involved in the matter, and by decree of a judge overseeing a matter. Failing to meet a deadline for an event defined by a court rule my result in a procedural error that is fatal to a party's position in the legal matter. Therefore, members of the legal professions place great emphasis and importance in meeting deadlines defined by the court rules.

The complexity and multiple sources of court rules creates a management problem for a legal practitioner. If a legal practitioner intends to successfully meet each and every deadline date in a matter, the legal practitioner must be aware of each court rule in each court, and the legal practitioner must be able to accurately calculate a court date using a set of court rules. In addition, the court rules may change in time, necessitating a recalculation of a matter's dates. While an automated court calender generation system may be used to encapsulate the court rules and relieve the legal practitioner from understanding the complexity of the court rules, some legal practitioners may not have the resources to create such an automated system. Also, even if a legal practitioner does have the necessary resources to create a court calender generation system, the legal practitioner may not want to maintain such a complex system.

SUMMARY OF THE INVENTION

In one aspect of the invention, a court date server is coupled to a database of court rules for generation of court dates. A user accesses the court date server via a communications network and submits event and jurisdiction data to the court date server. The court date server uses the event data and the jurisdiction data to generate a court calendar of event dates that is transmitted to the user. In one embodiment of a court date server, the court date server is coupled to a user database. The court date server stores the court calendar in the user database for later retrieval and use by the user. In addition, the court date server uses the stored court calendar to generate court date reminders that are sent to the user and to send notifications to the user when court rules are modified that affect the user's already calculated court dates.

In another aspect of the invention, a method of generating a court calendar by a court date server coupled to a user client over a communications network is provided. A court rule database coupled to the court date server. A user accesses the court date server via the communications network and transmits event data and jurisdiction data to the court date server. In response, the court date server gets a court rule from the court rule database and generates an event date using the event data, the jurisdiction data, and the court rule.

In another aspect of the invention, a user database having user data for a user is coupled to the court date server and the court date server puts the event date into the user database associated with the user data.

In another aspect of the invention, the court date server provides reminder messages to the user. To do so, the user data further includes a user electronic mail address for the user. The court date server gets the event date and the user electronic mail address from the user database and generates a reminder electronic mail message and transmits the reminder electronic mail message to the user. The reminder electronic mail message includes a reminder response link that the user selects to transmit a user reminder response to the court date server in order for the court date server to track reminders sent to, and received by, the user.

In another aspect of the invention, an administrator may update the court rules thus affecting a user's previously calculated event date. The court date gets the event date by the court date server from the user database and generates an updated event date using the event date and the updated court rule. The court date server then generates a notification electronic mail message using the updated event date transmits the notification electronic mail message to the user via the communications network using the user electronic mail address. The notification electronic mail message includes a notification response link that the user selects to transmits a user notification response to the court date server in order for the court date server to track notifications transmitted to the user.

In another aspect of the invention, the court date server receives user billing data for a user and generates an event generation charges document including a proposed charge to the user for generating event dates. The court date server transmits the event generation charges document to the user and receives a user acceptance in response. The court date server then generates an event date list using the generated event date and transmits the event date list to the user via the communications network.

In another aspect of the invention, a court date server for generating a court calendar is provided. The court date server is coupled to a user client over a communications network, locally coupled to a court rule database, and locally coupled to a user database with the user database having user data for a user. The court date server has a processor coupled to a memory. The memory has processor executable program instructions stored in it. The program instructions implement the features of the court date server. In operation, the court date server receives event data and jurisdiction data from the user client via the communications network. The court date server then gets a court rule from the court rule database using the event data and the jurisdiction data and generates an event date using the event data and the court rule. The court date server then puts the event date into the user database associated with the user data. The court date server uses the event date to generate an event date list and transmits the event date list to the user via the communications network. The court date server then uses the stored event date to and a user electronic mail address to transmit reminder electronic mail messages and change notification electronic mail messages to the user. The court date server also tracks the reminder and change notification electronic messages transmitted to the user.

BRIEF DESCRIPTION OF THE DRAWINGS

FIG. 4 is a Matter Management page as used by an exemplary embodiment of the present invention;

FIG. 6 is a Matter Information page as used in an exemplary embodiment of the present invention;

FIG. 8 is an Event Management page in accordance with an exemplary embodiment of the present invention;

FIG. 10 is a page used to add an event in accordance with an exemplary embodiment of the present invention;

FIG. 11 is an event edit page in accordance with an exemplary embodiment of the present invention;

FIG. 14 is an Event Generation Charges page in accordance with an exemplary embodiment of the present invention;

FIG. 16 is a Verify Events page in accordance with an exemplary embodiment of the present invention;

FIG. 17 is an Event Maintenance Log page in accordance with an exemplary embodiment of the present invention;

FIG. 18 is an Event Maintenance Detail page in accordance with an exemplary embodiment of the present invention;

DETAILED DESCRIPTION

Figure 1:
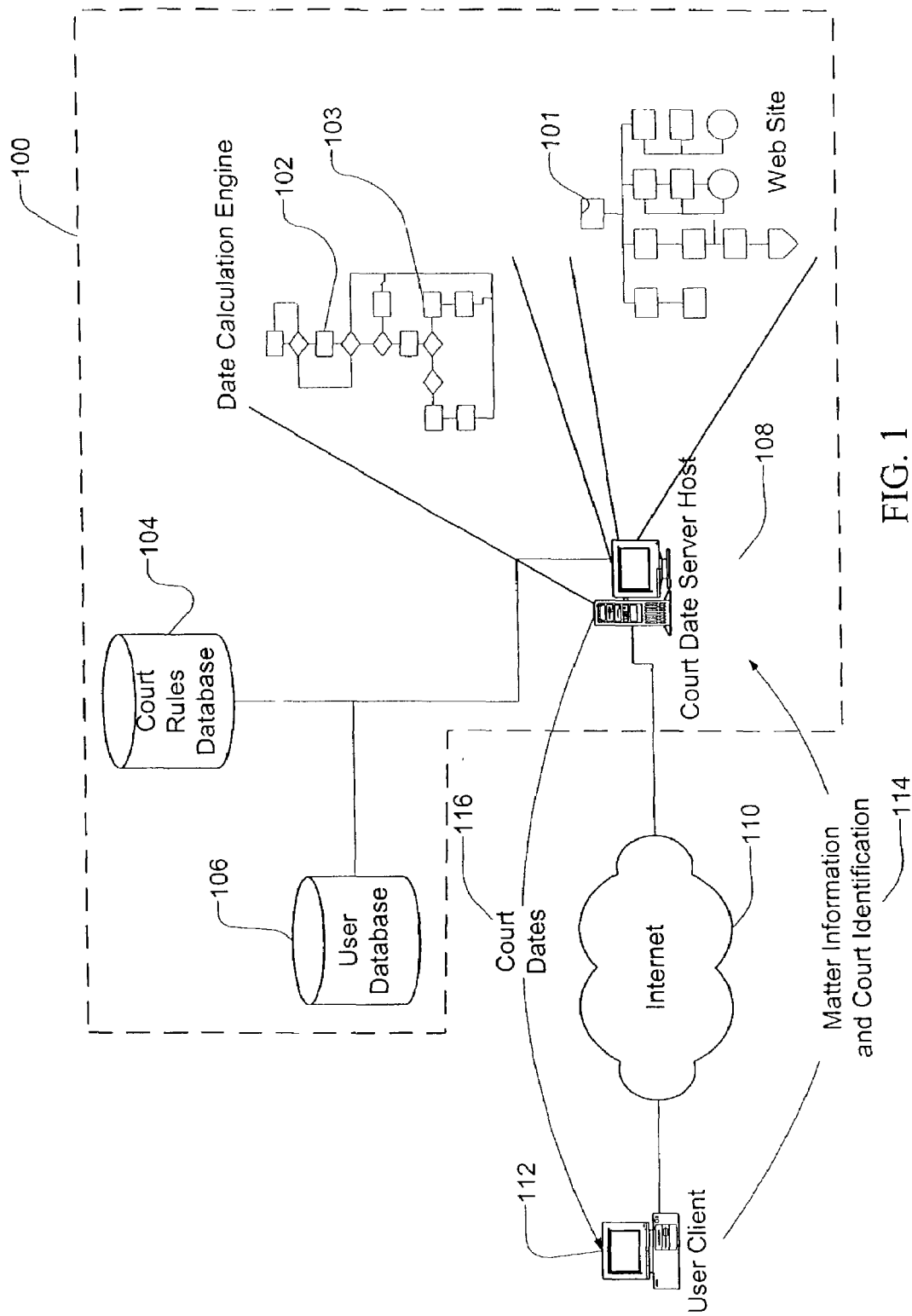
FIG. 1 is a diagram of an application service provider embodiment of a court date server in accordance with an exemplary embodiment of the present invention.

FIG. 1 is a diagram of an application service provider embodiment of a court date server in accordance with an exemplary embodiment of the present invention. A court date server 100 includes a Web site 101 having a plurality of Web pages for accessing features of the court date server via a communications link. The court date server includes a date calculation engine 102 for generation of a court calendar using court scheduling rules and a starting event date. The court date server includes a court rules database 104 for storage of court scheduling rules specific to each jurisdiction served by the court date server. The court rule database stores sets of court rules having date formulas used to schedule court deadlines and scheduling dates. All the data needed to schedule court related deadlines is contained in the court rule database.

A "Rule Set" includes the formulas used to calculate court dates for a specific court jurisdiction. A "Formula" includes a date calculation script that calculates a court deadline. A "Trigger" formula causes the scheduling of a set of court dates. The "Trigger" formula is what a user selects when scheduling dates using the court rule database. For example, when scheduling a Trial date the user selects the "Date of Trial" trigger formula and then enters its due date. A "Trigger" formula that bases its date calculation on other "Trigger" formulas is referred to as a "Branching Trigger".

A "Branching Trigger" can be scheduled like a regular "Trigger" (by selecting it and providing a date) or is scheduled automatically when one of the "Trigger" dates used by its formula calculation are scheduled. A "Trigger" formula cannot base its date calculation on a "Related" formula. Also, a "Trigger" formula does not have to have a date calculation script. The user provides the due date for triggers that do not contain a calculation script (at the time the trigger is scheduled). A "Related" formula is used when one of the trigger dates on which its calculation is based is scheduled. "Related" formulas can also base their calculation on other "Related" formulas. "Related" formulas that base their calculation on other related formulas cannot reference each other within the relationship. This prevents a "circular" relationship from occurring. For example, formula A bases its calculation on formula B which bases its calculation on formula A. In this case a circular relationship is created which would place the calculation engine into an infinite loop since neither formula A or B can successfully calculate their dates.

A "Group" is an interrelated set of dates. All court dates within a group have some relationship to at least one other date in the group. Groups allow us to maintain the integrity of interrelated dates. When a formula is added or changed, the forumula's script is examined for formula relationships and entries are made in the "Formula Relationship Table" so that the program can quickly retrieve the formulas that are used when a particular trigger date is scheduled. The data in this table is also used when displaying formulas to the user in a hierarchical folder format.

A user database 106 is included in the court date server for tracking the usage of the court date server by a plurality of users. In addition, the court date server stores generated court calendars in the user database for later access by a user. The court date server is hosted by a court date server host 108.

The court date server is accessed via a communications network, such as the Internet 110, by a user using a user client 112. In operation, the user accesses the court date server using Web pages or documents retrieved from the court date server's Web site. The user supplies matter data, trigger event data, and court identification 114 to the court date server via the communications network. The court date server's date calculation engine uses the matter data, trigger event data, and court identification to generate a court calendar 116 for transmission to the user via the communications network. The date calculation engine generates the court calendar by selecting a court's scheduling rules from the rules database using the court identification and the matter data. The date calculation engine then uses the trigger event data to calculate court dates moving forward from the trigger event's date.

Figure 2:
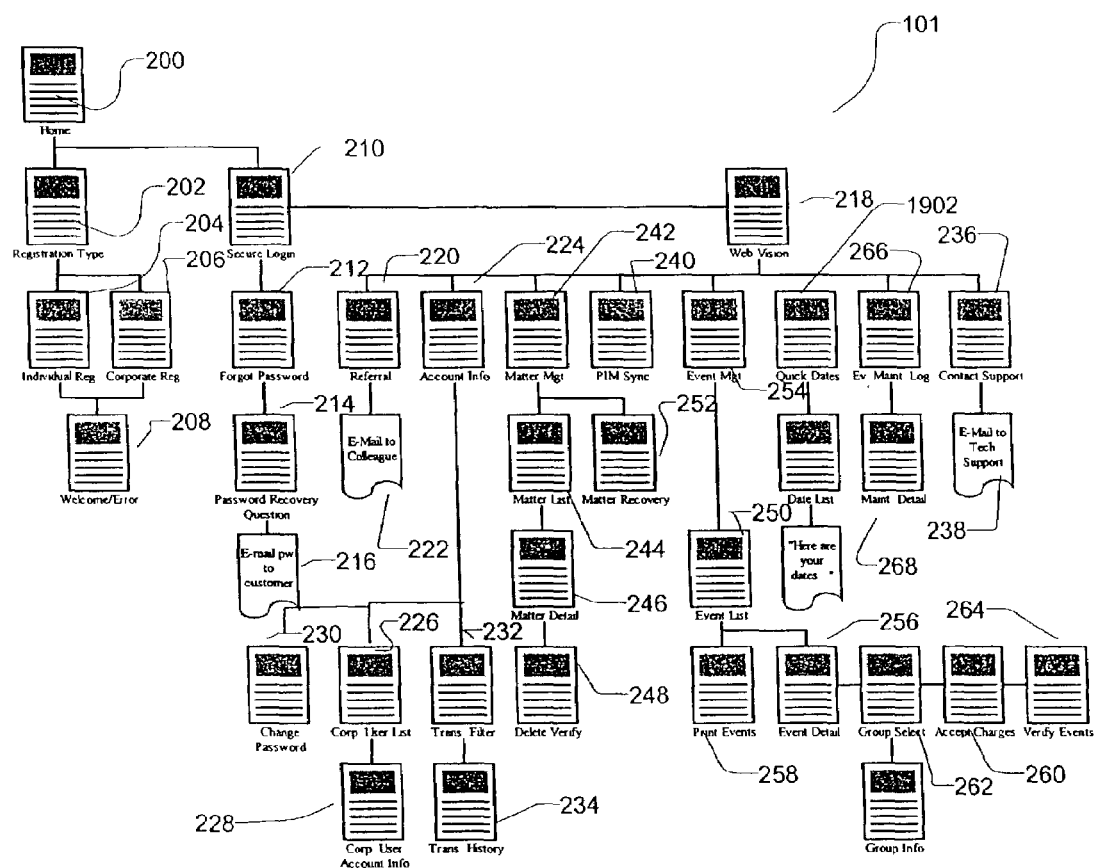
FIG. 2 is Web site diagram of a court date server in accordance with an exemplary embodiment of the present invention.

FIG. 2 is a Web site diagram of a court date server in accordance with an exemplary embodiment of the present invention. The Web site 101 includes a "Home" page 200 having links to sub-pages of the Web site. Users log in with a valid user id and password before any Web site sub-pages can be accessed. General data is placed on the Home page such as news flashes, product update data and an ad banner. The Home page further includes a link to a "Registration" page 202. From the Registration page, users can select an "Individual" registration page 204 or a "Corporate" registration page 206 for creation of individual or corporate accounts. An individual account allows a user to setup an account for their sole use. All date generation charges are billed to this user's account. A corporate account allows a user to setup an account that can be used for any number of users at a firm. Date generation charges for all users at the firm are billed to the corporate account. The administrator of the account (the user that created the corporate account) controls who at the firm can access the Web site.

The registration process begins when the user selects either the individual or corporate account type from the Registration page. User registration is a multi-page process that is completed before the user submits registration data. No two users can have the same "E-mail Address". An error message is returned if one user has the same e-mail address as another user. The user data collected during the registration process includes the user's first and last name, a date of birth for verifying user identity by a password recovery mechanism, and an E-mail address which also serves as the user's login name. The user then selects a password and a password question and response which are used if the user has forgotten their password. The user is then asked for company data including the user's firm's name and address and a contact telephone number.

Usage and billing reports are normally sent to the user using the data provided by the user. If the user would like this data to go to a different location, the user may provide additional billing data if their billing data is different than the previously supplied data. In addition, a user may set up a corporate account with one of several billing types. Possible billing types are "Bill my credit card" and "Monthly statement". If the user is creating an individual account then a user's credit card is automatically billed.

Figure 3:
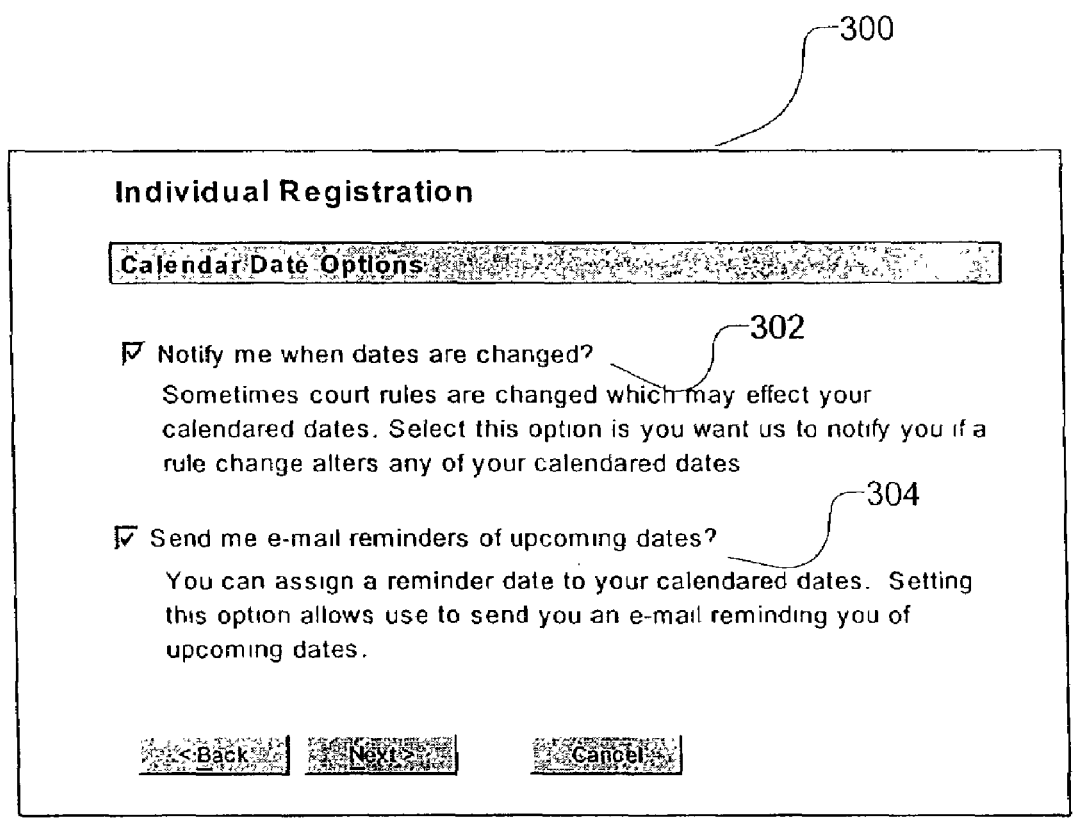
FIG. 3 is a calendar date options page as used by an exemplary embodiment of the present invention.

FIG. 3 is a calendar date options page as used by an exemplary embodiment of the present invention. A calendar date options page 300 includes settings that apply to the calendar dates added by the user. A "Notify me when dates are changed?" setting 302 tells the court date server whether or not the user wishes to be notified when a court date is changed because of a change to the scheduling rules. A "Send me e-mail reminders of upcoming dates?" setting 304 tells the court date server whether or not the user wants to receive e-mail reminder notices of upcoming calendar dates.

Referring again to FIG. 2, a "Welcome/Error" page 208 is generated and transmitted to the user. If an error occurs during the registration process (i.e. required data not provided, duplicate login name or password) then an error page is generated containing data about the error and how to resolve it. Otherwise, a welcoming message is displayed.

The Web site includes a "Secure Login" page 210 that is displayed after a user selects a "Login" link located on the Home page. The user enters their e-mail address and password in the fields provided and presses the "Login" button to log into the Web site. Selecting a "Cancel" button returns the user to the Home page. Selecting a "Forgot your password?" link displays a "Forgot your password" page 212 which is used to query the user using the previously described password question. A "Password Recovery" page 214 is displayed after the user enters their e-mail address for the account and their date of birth. This data is verified when a "Submit" button is pressed. If the data is incorrect then an appropriate error page is generated. A "Password Recovery" page 214 is displayed after the password verification data provided on the "Forgot your password?" page has been validated against account data for the user. This page is used to get the answer to the "password recovery question". The "password recovery question" is specified by the user when setting up an account. Selecting a "Submit" button sends the answer back to our server for validation. If the answer is incorrect, an appropriate error message is displayed. If the answer is correct, an e-mail is sent to the user containing the user's password. After successfully logging in, the user is allowed to access the features of the court date server.

A court date server main page 218 includes links to the Web site's sub-pages. Calendar generator functions are accessed from this page using links to the following pages. A "Refer a Colleague" page 220 allows users to refer a colleague to the Web site by sending an e-mail 222 to selected colleagues. The user can enter up to 5 e-mail addresses of colleagues and attach a personal message to each e-mail. A referral manager process (not shown) is responsible for sending the referral e-mails. The referral manager periodically checks a referrals database for new entries and creates and sends an appropriate e-mail to each new prospect. In one embodiment of a court date server, if a referral subsequently registers with the Web site and uses its services, the user that made the referral receives a credit that is applied to date generation charges. Selecting a "Submit" button sends the referral data to the court date server for processing. Selecting a "Cancel" button returns the user to the main page.

An "Account Information" page 224 allows the user to view and edit their account data. Billing data can also be viewed from here. The Account Information page allows users to view and change their account data and password, view a history of transactions and, if it is a corporate account, view and edit a list of account users. For added security, the users credit card number and expiration date are not displayed on this page. To view or change the account's credit card data the user clicks a "Change" link for a "Payment Information" section.

A "Corporate User List" page 226 includes a list of users for a corporate account. The list is in order by the user's last name. Selecting a letter from a ComboBox displays all users whose last name begins with the selected letter. New users are added by selecting on an "Add" button. This displays a "Corporate User" entry form used to enter a new corporate user.

Selecting an "Edit" link next to a users name allows the data for that user to be edited. Selecting a "Delete" link deletes the user from the list. A "De-activate" link is used to de-activate a user. When clicked, the user is deactivated and the link changes to "Activate".

A "Corporate User Account Information" page 228 is displayed when the "Edit" or "Add" links are selected from the "Corporate Account User List" page and allows the user to enter data about a corporate account user. Corporate account users are allowed to change their data once they have been setup by an account administrator. Date calculation charges are billed to the primary corporate account set up by an administrator when a corporate account user generates court dates. Selecting a "Submit" link validates the data and stores it in a "UserAccounts" table.

A "Change Password" page 230 allows the user to change their password. The user enters their existing password for verification purposes. An "Enter your new password" and a "Re-enter your new password" fields are compared and an error message displayed if they are not the same. Selecting a "Submit" button sends the password data to the court date server for validation and processing. If the existing password data provided by the user is incorrect an error message is returned. If the existing password data is verified then the user's password is changed.

A "Transaction Filter" page 232 allows a user to enter search criteria used to locate specific transactions with the court date server. The user enters filter criteria in the fields provided and clicks a "Find" link. If transaction records are found, a "Transaction History" page 234 is displayed containing an entry for each transaction. The fields in the Transaction Filter page include: a transaction ID to allow finding a transaction using its unique ID; a date range for searching for transactions that occurred in a specified date range; an amount range for searching for transactions in a specified billing amount range; a corporate user field for an administrator of a corporate account to search for transactions by a specific corporate user; and a "Show 'n' Transactions" field allowing the user to set how many transactions to display per page on a transaction history list. In a Transaction Filter page in accordance with an exemplary embodiment of the present invention, entering a specific transaction record ID disables the other filter fields on the page.

In another Transaction Filter page in accordance with an exemplary embodiment of the present invention, any of the filter options allowing for a range, such as the amount field, allow "open ended" ranges to be entered. If one end of a range is not provided, it means to include all records from that side of the range. In another Transaction Filter page in accordance with an exemplary embodiment of the present invention, if no filter is provided then all transactions are returned for the user.

The Transaction History page includes transaction history data retrieved from a "Transaction Log" table stored in the user database based on the Transaction Filter options. The filter options are displayed in a descriptive paragraph in the "Filter Used" section of the Transaction History page. Selecting a "Change" link returns the user to the "Transaction Filter" page allowing the user to make changes in the transaction filter. Each line item displayed in a "Transaction" section of the Transaction History page has the date and time of the transaction, the amount billed, the number of dates generated, the user that generated the dates if this is a corporate account, and a transaction ID. The number of transactions displayed on the Transaction History page depends on the "Show 'n' Transactions" field setting. Page links are displayed in a Transaction History page heading and are in the format "<<Prev 1 2 3 . . . Next>>". The " . . . " is used to indicate more pages than will fit in the space provided on the page. Selecting a "<<Prev" or "Next>>" link displays the previous or next page of transactions. The page links are not shown if the Transaction History page has only one page of transactions. selecting an "Account Info" button returns the user to the main Account Information page.

A "Contact Technical Support" page 236 allows a user to open an incident report with an administrator of the court date server by sending an error report e-mail message 238. A "Synchronize PIM" page 240 allows a user to download matter and event data to a personal organizer such as a Personal Digital Assistant (PDA) or other specialized computing device.

A "Matter Management" page 242 allows a user to enter filter criteria to locate a matter or matters they are interested in. Access to the data about a matter, as well as the events associated with a matter, is accessed from the resultant matter list.

FIG. 4 is a Matter Management page as used by an exemplary embodiment of the present invention. The user has the option of finding matters based on all or part of the matter name (400), using matter type field 402, a date opened field 404, or a date closed field 406. Inactive matters can also be optionally included in the search by selecting an inactive case field 408. A matter name search field 400 allows the user to enter all or part of the matter name they are looking for. Using radio button selections, 410, 412, and 414, beneath the matter name text field, users can search for an exact match, matter names that begin with the specified text, or matter names that contain the specified text.

Any of the filter options that allow for a range allow "open ended" ranges to be entered. If one end of a range is not provided, it means to include all records from that side of the range. If no filter is provided then all matters are returned by the query.

A "How Many Matters" field 416 allows the user to specify how many matters to display in a matter list. Selecting an "Add a New Matter" link 418 allows the user to add a new matter. Selecting a "Matter Recover" button 420 displays the "Matter Recovery" list which allows users to recover deleted matters and their associated dates.

Referring again to FIG. 2, after a user fills out the Matter Management page and submits it to the court date server, the court date server generates a "Matter List" page 242 by building a database query from the filter settings in the Matter Management page and querying the user database for matters satisfying the filter criteria.

Figure 5:
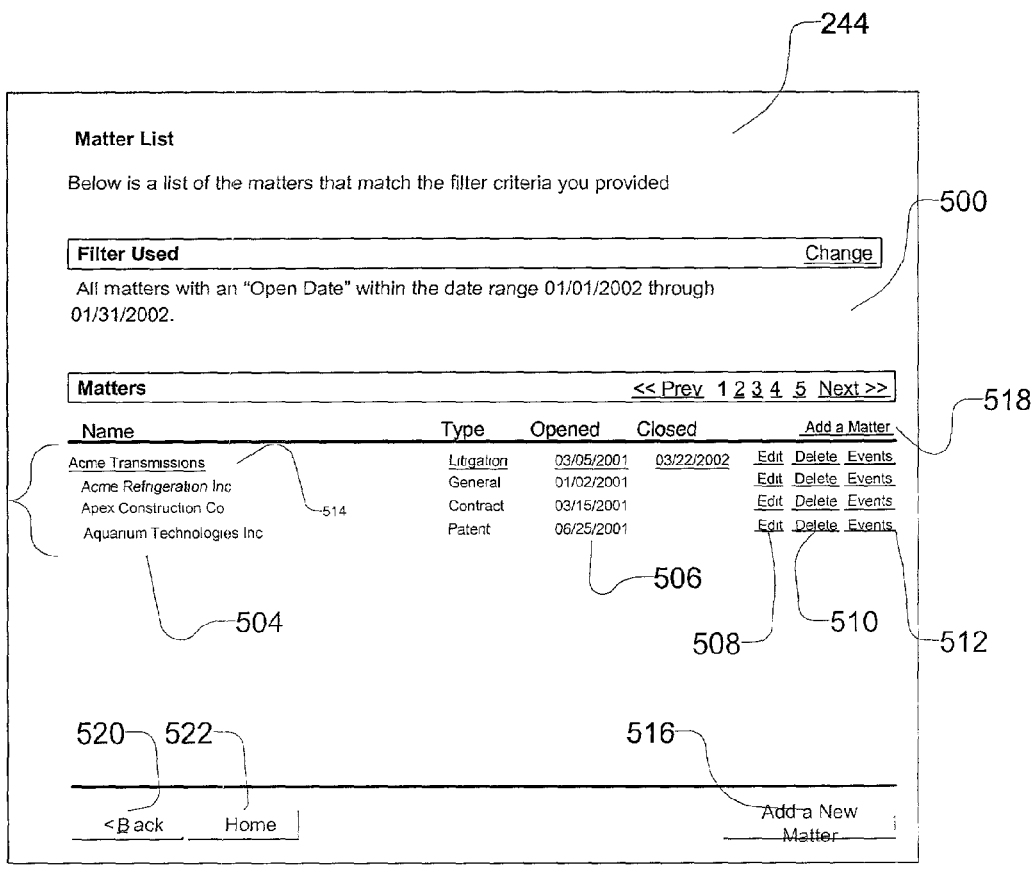
FIG. 5 is a Matter List page in accordance with an exemplary embodiment of the present invention.

FIG. 5 is a Matter List page in accordance with an exemplary embodiment of the present invention. A Matter List page 244 includes a display of the filter criteria 500 and a list 502 of matters that match the filter criteria entered on the "Matter Management" page. Each matter listed includes the name of the matter 504, the date the matter was opened 506, an "Edit" selection 508, a "Delete" selection 510, and an "Events" selection 512 button next to it. Inactive matters 514 are displayed in a different color than the active matters. Selecting either an "Add a New Matter" button 516 or an "Add a Matter" link 518 allows the user to add a new matter.

Selecting the Delete button next to a matter deletes the matter and all its associated records (transaction log records, events, etc.) from the court date server's user database When the "Delete" button is pressed a "Matter Deletion" verification page 246 (FIG. 2) is displayed. Selecting the Edit button allows the user to edit the matter. Pressing the Events button displays the events for the matter.

Selecting a "Back" button 520 returns the user to the "Matter Management" page 242 (FIG. 2). Selecting the "Home" button 522 returns the user to the main page 218 (FIG. 2).

FIG. 6 is a Matter Information page as used in an exemplary embodiment of the present invention. A Matter Information page 600 allows a user to add and edit matter data. A matter name field 602 is used to enter a matter name. Matter names are unique for each user. In other words, a user can not have two matters with the same name.

A matter type field 604 is used to enter a matter type. The user selects an existing matter type from a list or may enter a new one. A docket ID field 606 is used to enter a user defined docket ID for the matter.

A date opened field 608 is for display of the date the matter was opened. For a new matter, this field is set to the current date. A date closed field 610 is for display of a date on which a matter was closed.

A jurisdiction field 612 displays a default jurisdiction for a matter. This field is set by using a "List" link 614 and selecting from a to-be-described Jurisdiction Expert process. The Jurisdiction Expert includes a hierarchical list of valid jurisdictions for a matter.

An inactive field 616 allows a user to set the status of a matter to inactive. The matter will not appear on any lists or reports unless the user requests inactive matters.

A matter ID 618 is shown and an "Events" button 620 is available when editing an existing matter. Selecting the Events button displays an "Event List" page 250 (FIG. 2) for a matter.

Selecting a "Delete" button 622 deletes a matter and all of its associated records (transaction log records, events, etc.) When the "Delete" button is pressed the Matter Deletion verification page 248 (FIG. 2) is displayed.

Selecting a "Submit" button 624 sends the matter data to the court date server for processing and storage in the user database. If an error occurs after submitting the data to the database, an error page is displayed containing data about the error and possible solutions.

Referring again to FIG. 2, a "Matter Recovery" page 252 is available to the user to recover a matter that the user has inadvertently deleted. This page includes a list of deleted matters.

Figure 7:
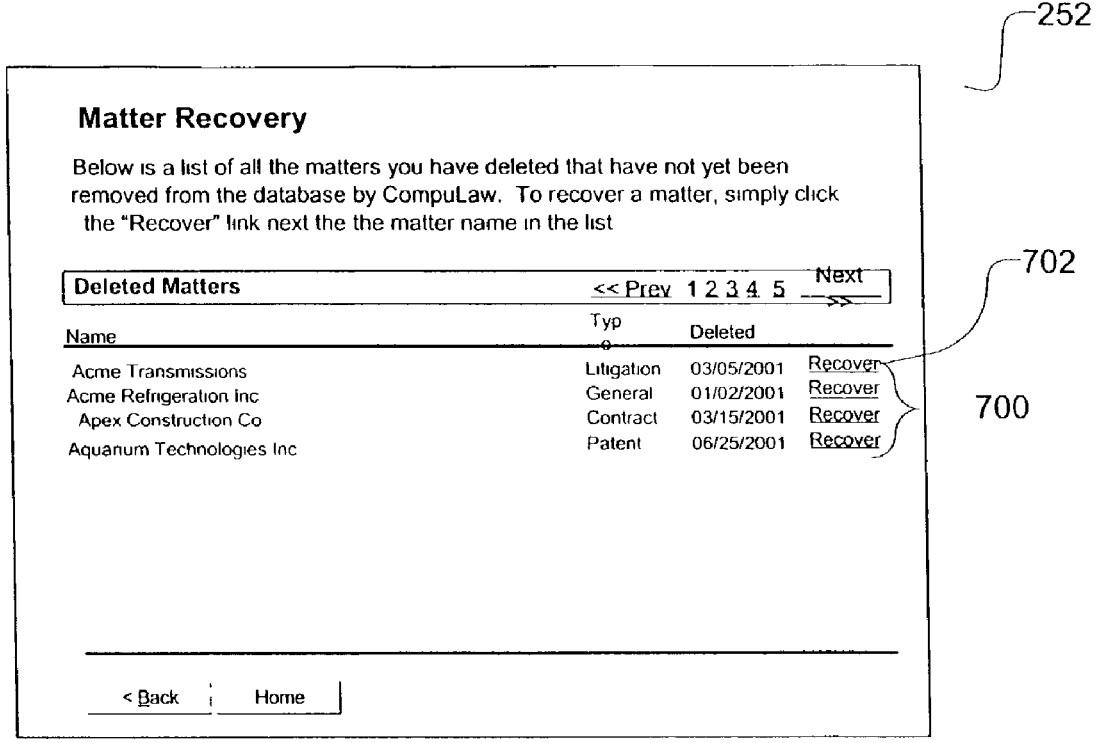
FIG. 7 is a Matter Recovery page in accordance with an exemplary embodiment of the present invention.

FIG. 7 is a Matter Recovery page in accordance with an exemplary embodiment of the present invention. A Matter Recovery page 252 includes a list 700 of deleted matters. To recover a deleted matter, the user clicks a "Recover" link 702 next to a matter in the list. After recovering a deleted matter, the matter and all it's associated dates are available for the user to access.

Referring again to FIG. 2, an "Event Management" page 254 includes filter fields that allow a user to search the user database for events. A user may also add a new event from this page.

FIG. 8 is an Event Management page in accordance with an exemplary embodiment of the present invention. An Event Management page 254 allows multiple filter options to be entered by a user in order to find an event. A matter name field 800 allows a user to search for a specific matter name or part of a matter name. A search options pull down menu 802 allows a user to set search options including "Exact" for exactly matching a matter name, "Beginning with" for matching to any matter beginning with an entered matter name, and "Includes" for matching to any matter whose name includes an entered matter name. A matter type field 804 allows a user to find events based on the matter type assigned to each matter for which events have been scheduled.

A due date field 806 allows a user to search for events within a specified due date range. A time field 808 allows a user to search for events based on an event time. An added on field 810 allows a user to search for events based on the date they were added to the system. A last changed field 812 allows a user to search for events based on when they were last changed. Any of the filter options that allow for a range also allow "open ended" ranges to be entered. If one end of a range is not provided, it means to include all records from that side of the range.

A unique ID field 814 allows a user to search for a specific event using an event's specific ID. A formula field 816 allows a user to search for events that use a specific formula for their calculation. This field includes a "Rule set" field and a "Formula ID" field separated by a hyphen.

A formula description field 818 allows a user to search for events based on the contents of a formula description. A pull-down menu 820 allows a user to search for all or part of a formula description. Search options include "Exact", "Beginning with" and "Includes" as previously described.

A note field 822 allows a user to search for events based on the contents of the mote field. A pull-down menu 824 allows a user to search for all or part of a note. Search options include "Exact", "Beginning with" and "Includes" as previously described.

An "Include Completed Events" button 826 allows a user to include completed events in the event search. An "Include Deleted Events" button 828 allows a user to include deleted events in the event search. A "How Many Events" field 830 allows a user to set the number of event records to display per page on a resultant event list.

With the exception of the "Include completed events" and "Include deleted events" settings, the user provides data for at least one of the other fields on this page. Selecting a "Find" button 832 submits the search request to the court date server for processing.

Referring again to FIG. 2, the court date server receives the filter settings from the Events Management page 254 and generates the Event List page 250 included a list of events satisfying the filtering criteria.

Figure 9:
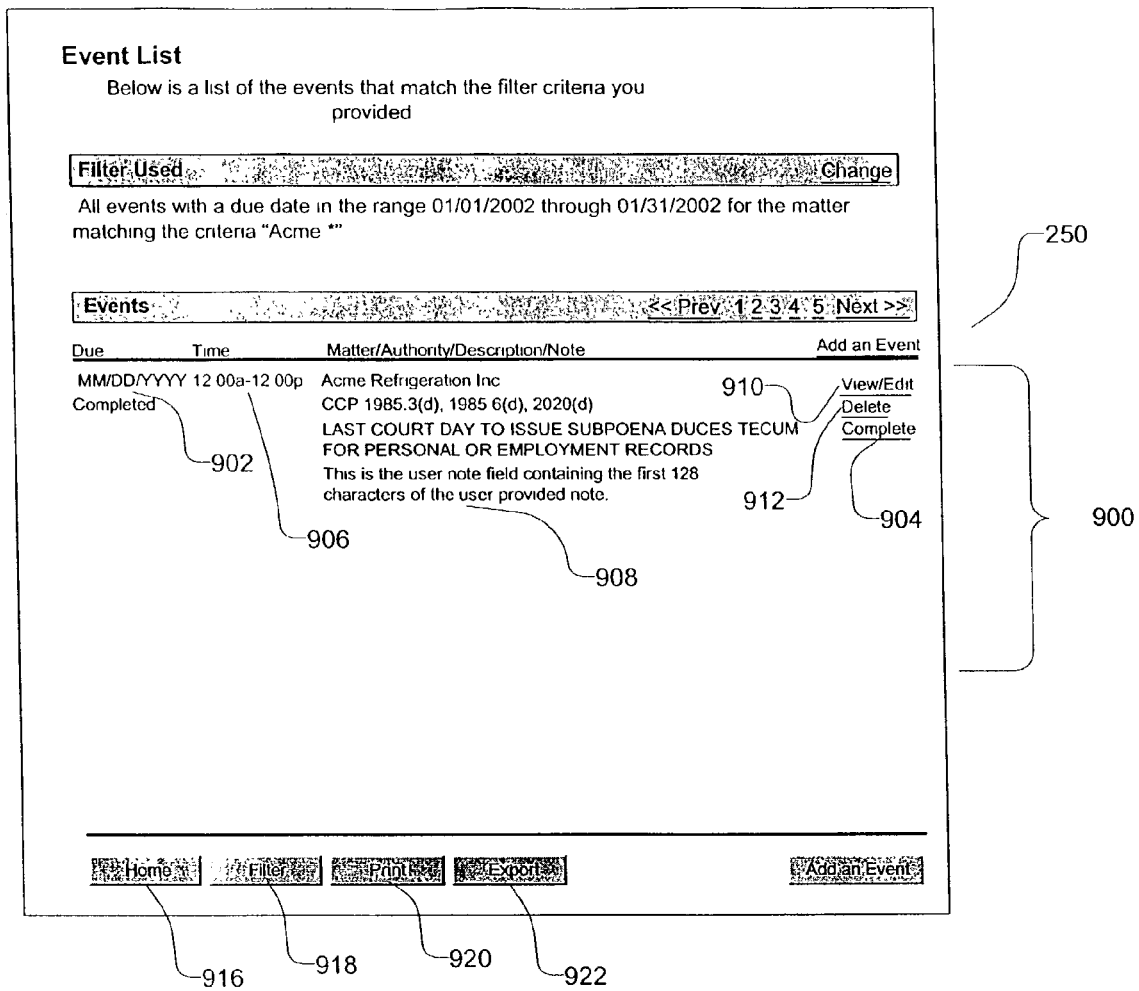
FIG. 9 is an Event List page in accordance with an exemplary embodiment of the present invention.

FIG. 9 is an Event List page in accordance with an exemplary embodiment of the present invention. An Event List page 250 includes an event list 900 showing the events that meet the filter criteria provided from the Events Management page. The To event list includes the following data for each listed event. A due field 902 has the event due date and the word "Completed" if the event has been marked completed. If the event is marked completed, a "Complete" link 904 is changed to "Un-complete". A "Time" field 906 has the start and end time of the event. If the event only has a start time then only that time is displayed. If the event has no time then nothing is displayed in this field. A "Matter/Authority/Description" field 908 includes the matter name, a formula authority (the source of the deadline), first 2 lines of a formula's description and first 2 lines of a user provided note. If the formula description or note data needs to be truncated to fit within the 2 line limit then a " . . . " is placed at the end of the text to indicate that more text is present.

The listing for each event includes links allowing the user to edit/view, Delete and Complete/Uncomplete an event. Selecting an "Edit/View" link 910 displays an "Event Detail" page 256 (FIG. 2) having data about an event. Selecting a "Delete" link 912 marks the event as deleted and removes it from the list. Selecting a "Complete" link 904 marks the event as completed and places the word "Complete" under the due date in the due field and changes the "Complete" link text to "Un-complete". Selecting "Un-complete" removes the word "Complete" from the due field and changes the link text back to "Complete".

Selecting a "Home" button 916 returns the user to the main page 218 (FIG. 2). Selecting a "Filter" button 918 returns the user to the Event Management page so they can change the filter options. A "Print" button 920 allows the user to print the list of events and an "Export" button 922 allows the user to export the events to a delimited ASCII file. Referring again to FIG. 2, a "Print Events" 258 page is displayed when the "Export" button is selected from the Event List page 250. The Print Events page allows the user to specify a file name and location as well as other delimiter options. Selecting an "Export" button exports a current event list to the specified file. Selecting a "Back" button returns user to the Event List page. An "Example" label included in the Print Events page changes depending on the delimiter options selected.

FIG. 10 is an add event page used to add an event in accordance with an exemplary embodiment of the present invention. An add event page 1000 is displayed when an "Add a New Event" link is selected from one of the previously described pages. The add event page steps the user through a process of scheduling court dates using the scheduling rules database. As each step is completed, subsequent steps are enabled. The user performs each step in sequence.

A matter for which event dates will be generated is entered using a "List" link 1002 to display the previously described Matter Management page allowing the user to locate a specific matter. The user may bypass the Matter Management page by entering search criteria in a matter field 1004 then selecting the "List" link. For example, if the user wants to find all matters beginning with the word "Acme" they would enter "Acme*" into the field and select the "List" link. New matters can be added from either the Matter Management or Matter List pages as previously described.

Once a matter is selected, the user selects a jurisdiction. The jurisdiction is set by using a to-be-described Jurisdiction Selection Expert accessed through link 1006. Once selected, the jurisdiction is displayed in the jurisdiction field 1008.

Once the jurisdiction has been selected, the user can select an appropriate court event from a to-be-described Event Selection Expert accessed using link 1010. Once selected, the event is displayed in an event field 1012.

Once an event has been selected, the user provides a date in a date field 1014. An entry in a time field 1016 is optional. Both these fields are set by selecting data from appropriate selection dialogs reached by links 1018 and 1020.

A reminder field 1022 allows a user to schedule a reminder e-mail to be sent to the user for an event. Setting an "Apply to all scheduled dates?" option 1024 applies the reminder offset entered in the reminder field to all subsequently scheduled dates (for example 1 day before each event).

A note field 1026 allows a user to enter a note that will be attached to an event trigger date. Setting an "Apply to all scheduled dates?" option 1028 applies a note to all subsequently scheduled event dates. The user selects a "Schedule" button 1030 to schedule the dates or selects a "Cancel" button 1032 to return to a previous page.

Figure 21:
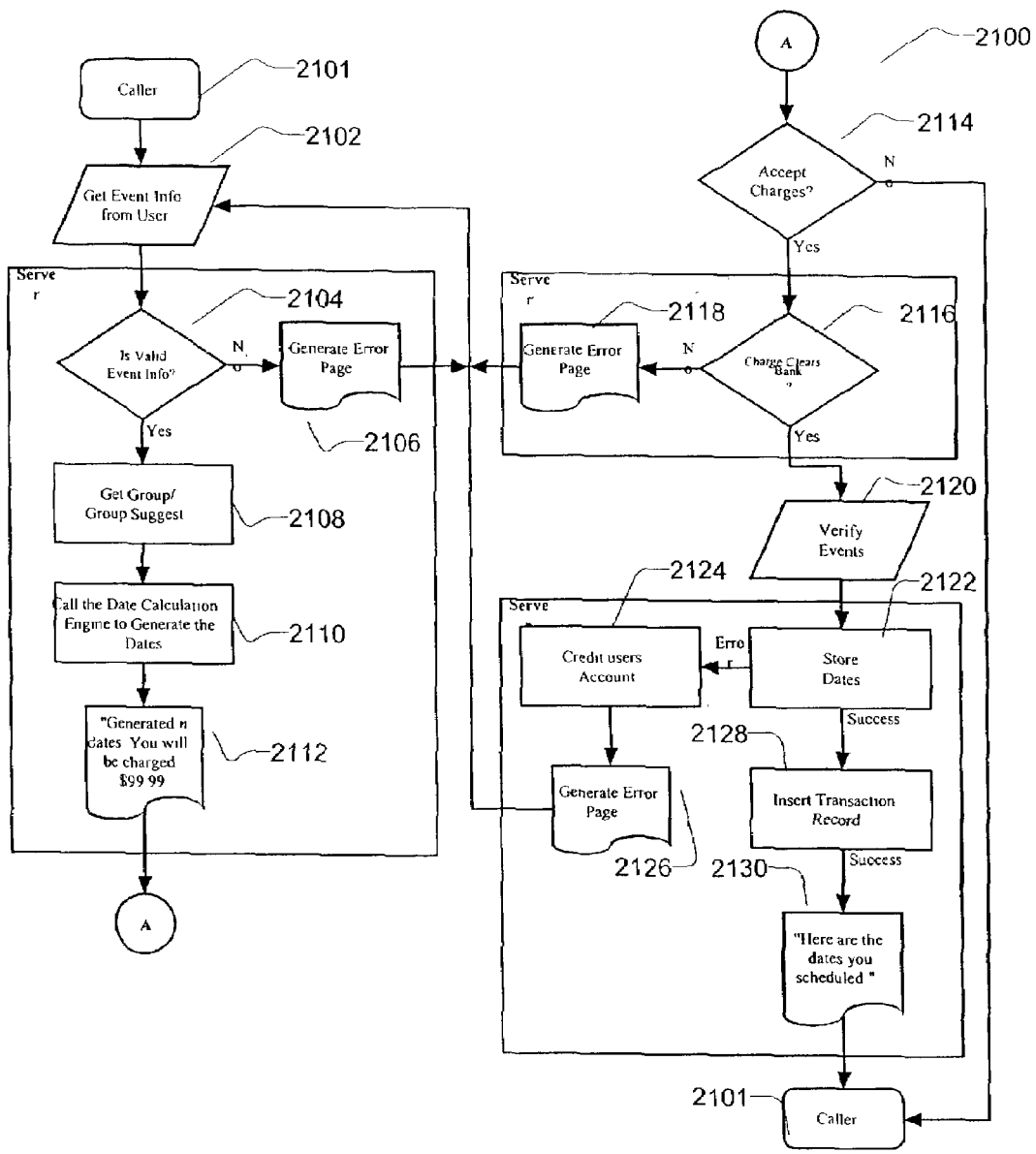
FIG. 21 is a process flow diagram of an add event process in accordance with an exemplary embodiment of the present invention.

FIG. 21 is a process flow diagram of an add event process in accordance with an exemplary embodiment of the present invention. An add event process 2100 adds an event date for a user. A caller process 2101 gets (2102) event data from the user and transmits the event data to the court date server. The court date server validates (2104) the event data is valid. If the event data cannot be validated, the court date server generates (2106) an error document and transmits the error document back to the caller process.

If the event data is valid, the court date server gets (2108) a group to which the event belongs in order to determine the new event's trigger date. The court date server calls (2110) the date calculation engine to generate new dates for the event. The court date server uses the new dates to generate a date calculation result document 2112, such as a Web page, including data on the number of dates generated and the calculated amount to be debited from the user's account or charged to a user's credit card account. The calculation result document is transmitted to the user so that the user can accept or reject a debit or charge of the calculated amount. If the user does not accept (2114) the debit or charge, the add event process terminates and no debits or charges are made the user's accounts and no dates are stored our updated in the user database.

If the user does accept the debit or charge, the court date server charges (2116) the user's charge card or debits the user's account. If the debit or charge is not successful, the court date server generates (2118) an error page for transmission back to the user. If the debit or charge is successful, the court date server verifies (2120) the event dates and stores (2122) the dates in the user database. If the store process is not successful, the court date server credits (2124) the user's account or credit card account and generates (2126) an error document for transmission back to the user. If the court date server successfully stores the event date data into the user database, the court date server inserts (2128) a transaction record into a transaction database and generates a date list document (2130) using the event data and the new dates for transmission back to the user. Control then returns to the caller process.

FIG. 11 is an event edit page in accordance with an exemplary embodiment of the present invention. An event edit page 1100 allows the user to view and edit event data. The page is initially displayed in "View" mode. That is, none of the event data can be altered. To change an event, the user selects a "Change" button 1102. Selecting the "Change" button enables the data entry fields and changes the "Change" button text to "Submit".

Only "Due date" 1104, "Time" 1106, "Reminder" 1108, "Note" 1110, "Complete" 1112, and "Don't change" 1114 fields on the event can be changed. The "Due date" and "Time" fields are set by using the associated selection dialogs accessed by links 1116 and 1118, "Calendar" and "Time" links respectively. The "Reminder" field is set using a reminder spinner button 1120 next to the "Reminder" field. The user can type anything they want into a "Note" field 1122. In operation, a user modifies the due date for the event and selects the Submit button to update the data stored by the court date server in the user database.

Figure 12:
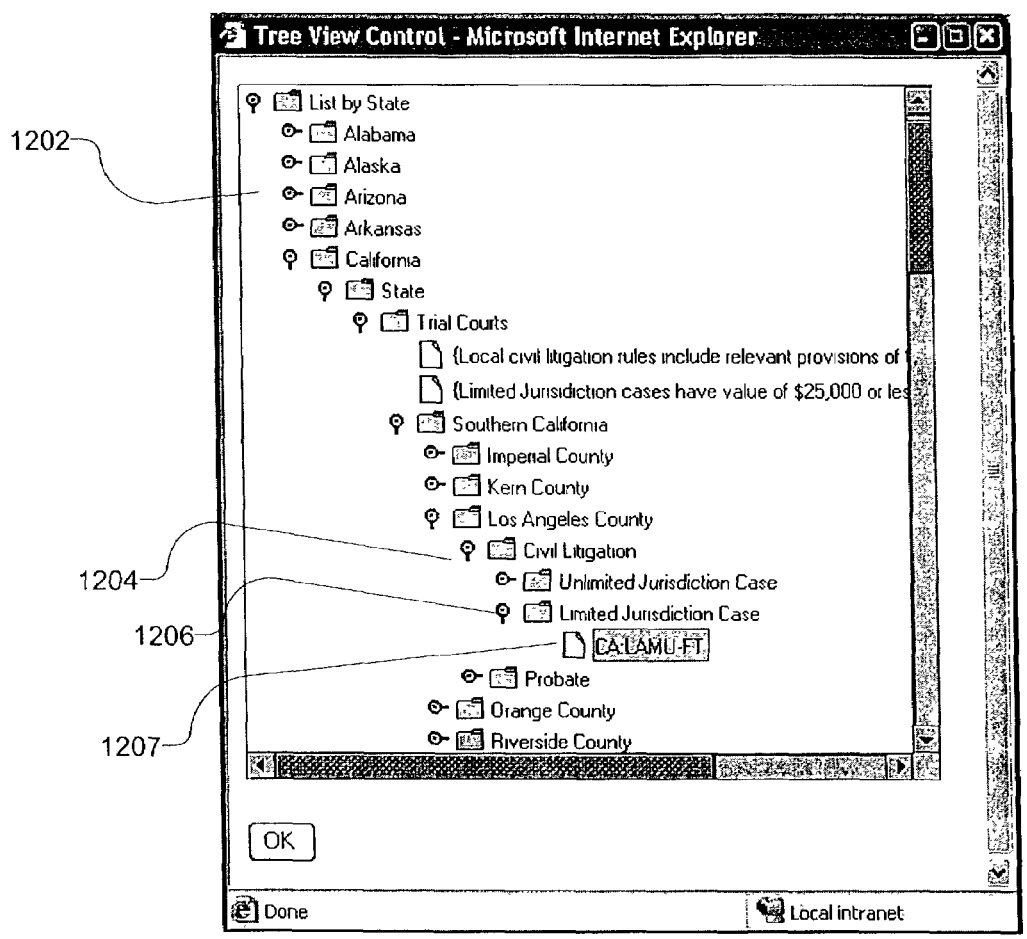
FIG. 12 is a screen capture of a Jurisdiction Selection Expert in accordance with an exemplary embodiment of the present invention.

FIG. 12 is a screen capture of a Jurisdiction Selection Expert in accordance with an exemplary embodiment of the present invention. A Jurisdiction Selection Expert (JSE) 1200 allows users to select rule sets used to schedule dates for any jurisdiction from a hierarchal list of jurisdictions. The JSE includes a hierarchical list 1202 of rule sets used by a court date server. The user selects category topics, such as category 1204, to expand the sub-categories beneath, such as subcategory 1206. Selecting on a sub-category either displays more categories or a selectable jurisdiction item 1207.

In one court rule database in accordance with an exemplary embodiment of the present invention, court rules are encoded as formulas including data used to generate a JSE hierarchical folder tree. For example, where "f" means a closed folder, and "fo" means an open folder:

f Los Angeles Superior Court
fo Orange County Superior Court
    f $DC Last court day to complete non-expert discovery . . .

fo $MO Date set for motion to be heard.
        3 cn Last court day to request continuance hearing . . .
        5 db Last court day to file and serve replay papers . . .
        10 db Last court day to file and serve opposition to motion . . .
    fo $TR Date of trial.
        2 cb Last court day before trial for either party to serve .
        . .
        70 df Last court day to demand the exchange of expert .
        . .
        $TS 10 df (sec/rel)
f San Diego County Superior Court The relationship data for this tree view is retrieved from a to-be-described formula relationship table.

In one court rule database in accordance with an exemplary embodiment of the present invention, the format for JSE data providing hierarchical text data for a court is as follows:
    <tree hierarchy text>||<tree hierarch text>... ||[!USAGE!]|!NOTE!]<rule set1>;<rule set 2>[!MORE!] . . .

The "<tree hierarchy text>" entries tell the court date server where in the tree hierarchy to place an entry for the rule set. Each tree hierarchy text entry is separated by "||". The rule set usage data (that is the actual rule set selection data) is located after a "[!USAGE!]" tag. If this is a note entry then the note text follows a "[!NOTE!]" tag. Each rule set in the usage section is separated by a semi-colon (;). A "[!MORE!]" tag is used when an entry needs to be made in the JSE selection tree in more than one location.

The following example shows JSE data for the CA:LA-FT rule set:
    List by State||California||State||Trial Courts||Southern California||Los Angeles County||Civil Litigation||Unlimited Jurisdiction Case||Case assigned to Independent Calendar Judge||[!USAGE!]CA:LA-FT;CA:DISC The next example shows how to add a note to a JSE branch. The note entries appear immediately beneath the specified branch:
    List by State||California||State||Trial Courts||[!NOTE!] Local civil litigation rules include relevant provisions of CCP, CRC and California Code. Limited Jurisdiction cases have value of $25,0000 or less, see CCP Sec. 85.

The next example shows the JSE data for the CA:APPRULE rule set (shows how to use the "[!MORE!]" tag):
    List by State||California||State||Appellate||Sixth Appellate District—Sixth Appellate has no local rule deadlines. CA:APPRULE will be selected. ||[!USAGE!]CA:APPRULE[!MORE!]List by State||California||State||Appellate||Supreme Court|| [!USAGE!]CA:APPRULE In the above example, the "CA:APPRULE" rule set is located under the "Sixth Appellate District" and "Supreme Court" branches of the JSE selection tree.

In one court date server in accordance with an exemplary embodiment of the present invention, the data displayed by the JSE is contained in a text file. The text file is created and maintained by an administrator of a court date server. If jurisdictions are added, changed, or removed, a new file is created and copied to the court date server Web site. In another court date server in accordance with an exemplary embodiment of the present invention, the court rule database includes jurisdiction hierarchy data linked to a rule set record. The data used to build the JSE is retrieved from each rule set.

In the illustrated example, a "Limited Jurisdiction Case" child 1206 has been expanded to show the actual Jurisdiction (rule set) code 1207 used to schedule dates for that venue. In another court date server in accordance with an exemplary embodiment of the present invention, the JSE does not expose this final child node. When the user selects a jurisdiction, such as the "Limited Jurisdiction Case" child node, the JSE returns the complete hierarchical path. In the example shown, "List by State->California->State->Trial Courts->Southern California->Los Angeles County->Civil Litigation->Limited Jurisdiction Case" is returned as well as an actual jurisdiction code, for example "CA:LAMU-FT", that is passed to a date calculation engine for event date generation. If more than one jurisdiction code is present for a selected jurisdiction then a comma separated list of jurisdiction codes is returned (for example "CA:LA-FT,CA:DISC").

Figure 13:
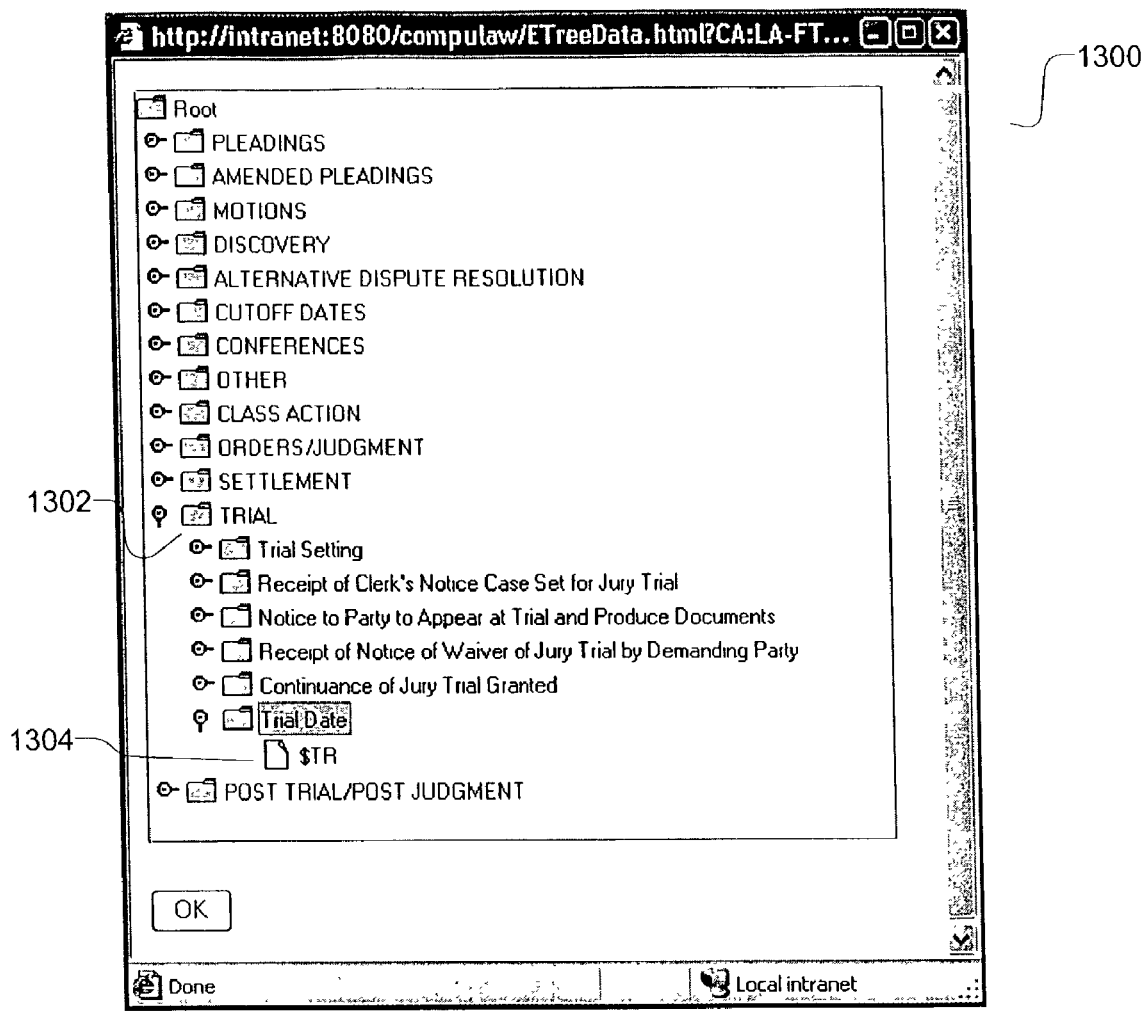
FIG. 13 is a screen capture of an Event Selection Expert in accordance with an exemplary embodiment of the present invention.

FIG. 13 is a screen capture of an Event Selection Expert in accordance with an exemplary embodiment of the present invention. An Event Selection Expert (ESE) 1300 is used by a user to select an event type for an event. In the illustrated example, a "Trial Date" node 1302 has been selected exposing actual event code "$TR" 1304 that is passed into a to-be-described date calculation engine for date generation. In another court date server in accordance with an exemplary embodiment of the present invention, the actual code is not shown. In the illustrated example shown, when the user selects the Trial Date node, the ESE returns the node description "Trial Date" and the actual event code of "$TR" 1304. The data used by the ESE is compiled from the data tables included in the court rule database.

A trigger formula is court rule formula that is used as a formula for a calculating event dates for a trigger event. A trigger event is an event that is linked to other events. When the trigger event date is calculated by the court date server using the trigger events trigger formula, then other dates for other events linked to the trigger event are calculated as well. Table A includes database entries for a trigger formula including data used to generate an ESE by the court date server:

| Field | Explanation |
| --- | --- |
| Key Code | The key code for the trigger date. |
| Category | Category code attached to this formula. |
| Priority | Priority code attached to the formula. |
| Authority | The formulas authority text. |
| Formula | Contains the formula script. |
| Description | The event description. |
| Expert Data | Event Selection Expert data. See below for a full description. |

Each trigger formula includes ESE data used to place the trigger in the ESE selection tree. The format for the ESE data is:
    <tree hierarchy text>||<tree hierarchy text> . . . ||[!KEYCODE! |!NOTE!]<key code>[!MORE!] . . .

The "<tree hierarch text>" entries include a location of the entry in the ESE selection tree. Key code data (that is the key code selection data) is located after the "[!KEYCODE!]" tag. The "[!MORE!]" tag is used if ESE data for a trigger formula needs to be in more that one location in the ESE selection tree.

Here is an example of an ESE data string for a "Date of Trial" trigger formula:

Trial||Trial Date||[!KEYCODE!]$TR

A note may appear beneath a branch in the selection list as shown below:

Trial||Trial Date||[!NOTE!]This is a note that appears just beneath the "Trial Date" branch.[!MORE!] Trial||Trial Date||[!KEYCODE!] $TR In the above example, a note is added to the "Trial" branch.

Figure 27:
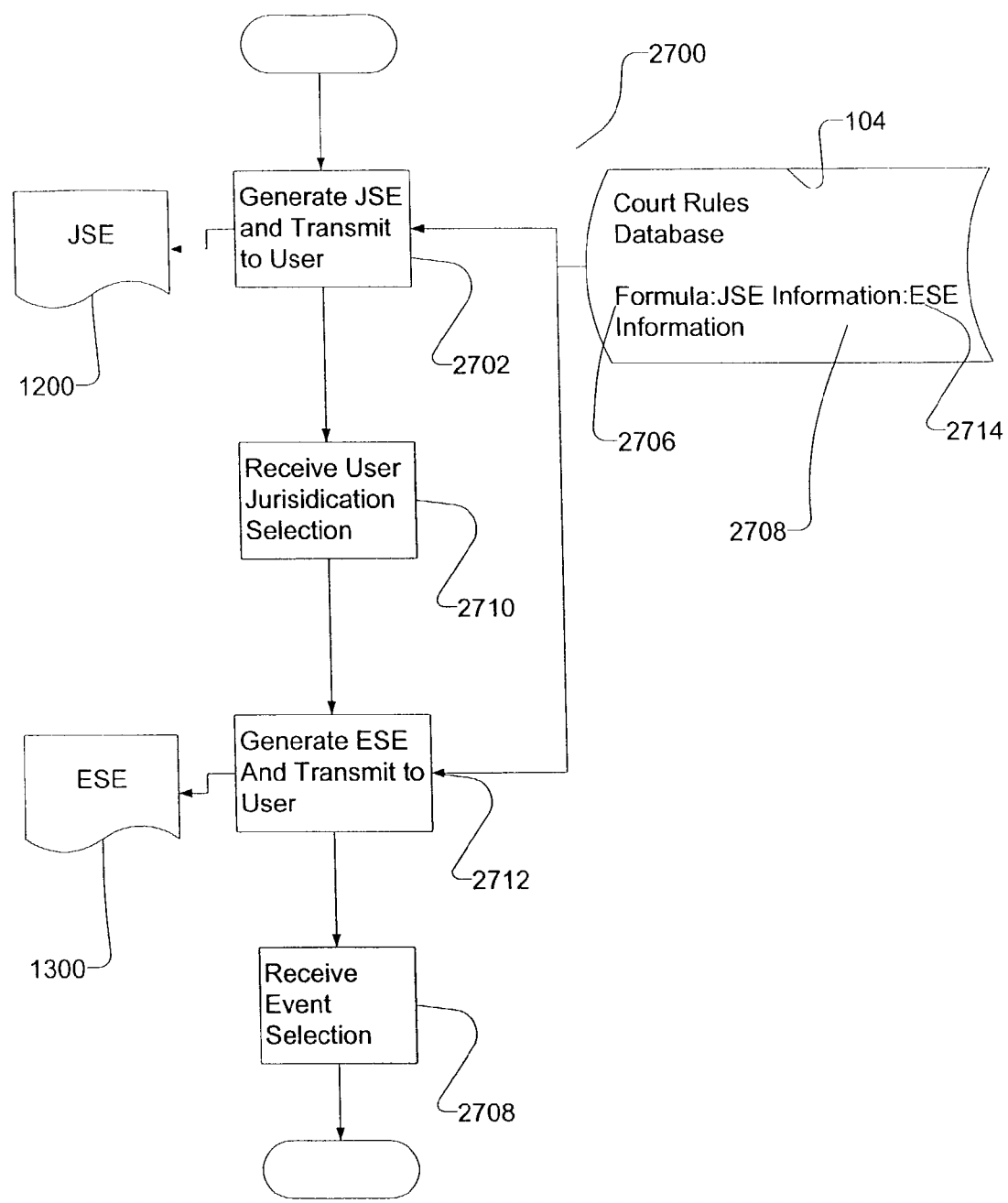
FIG. 27 is a process flow diagram of a jurisdiction and event expert generation process in accordance with an exemplary embodiment of the present invention; and APPENDIX A is a pseudocode listing for software components of a court date server in accordance with an exemplary embodiment of the present invention.

FIG. 27 is a process flow diagram of a jurisdiction and event expert generation process in accordance with an exemplary embodiment of the present invention. A jurisdiction and event expert generation process 2700 uses a court rule database 104 including date calculation formulas 2706 having JSE data associated with the formulas as previously described to generate a JSE document 1200. The jurisdiction and event expert generation process transmits the JSE document to the user and receives 2710 a jurisdiction selection from the user selected using the JSE. The jurisdiction and event expert generation process generates an ESE 1300 using the selected jurisdiction and ESE data 2714 associated with the formulas in the court rule database. The ESE document is transmitted to the user and the jurisdiction and event expert generation process receives 2708 an event selection from the user selected using the ESE.

Referring again to FIG. 2, the court date server Web site includes an "Event Generation Charges" page 260. The Event Generation Charges page is used to confirm a user's request to have event dates calculated by the court date server.

FIG. 14 is an event generation charges page in accordance with an exemplary embodiment of the present invention. When new dates are added, the user is prompted to accept event date generation charges using an Event Generation Charges page 260. The Event Generation Charges page displays a number of events added 1400 to the user database along with an amount 1402 that is charged to the user's credit card. The amount billed includes the amount for generating the event dates and may include an event date storage charge. Selecting an "Accept" button 1404 transmits the user's acceptance of the charges to the user's account by the court date server and finalizes scheduling of the event dates. Selecting a "Cancel" button 1406 cancels the date generation process.

Users are charged based on the number of additions and/or changes made to an event group for the billing type assigned to the rule set used to generate event dates. A charges matrix table maintained by an administrator of a court date server determines the amount to charge for date calculations based on the number of addition and/or changes to a group. A rule set type table is used to retrieve the billing type data of a rule set. Once the charge has been calculated, any user discounts and credits are applied. New dates and changes made by an event maintenance process initiated by the administrator of a court date server are not charged to the user.

Figure 22:
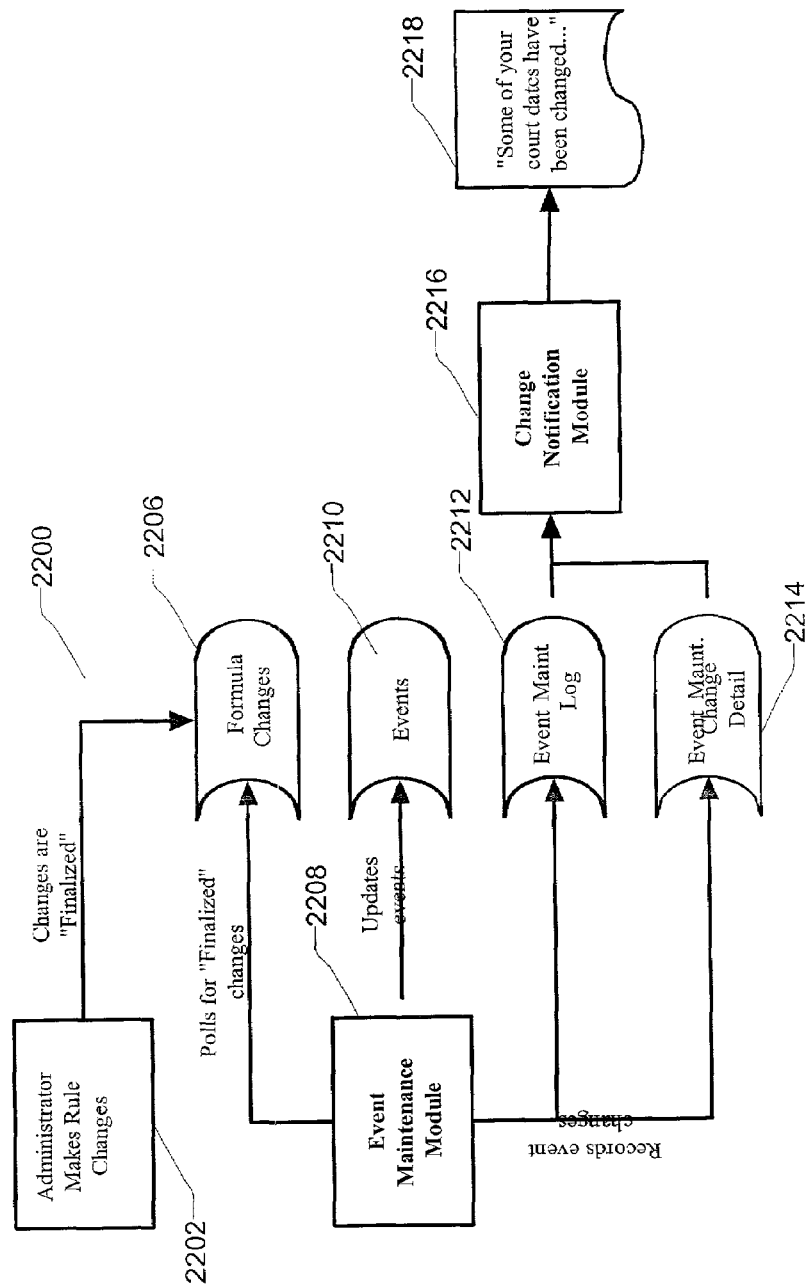
FIG. 22 is an event maintenance process in accordance with an exemplary embodiment of the present invention.

FIG. 22 is an event maintenance process in accordance with an exemplary embodiment of the present invention. An event maintenance process 2200 is initiated by an administrator to maintain and update the court rule database. As the court rule database is updated, an event date previously calculated for a matter may need to be updated if the court rules for calculating the event date have been changed. To initiate the event maintenance process, the administrator makes (2202) formula changes that are stored in a formula changes table (2206) and in the court rules stored in the court rules database. An event maintenance module 2208 is responsible for processing event groups affected by changes to the court rule formulas. The event maintenance module periodically polls the formula changes table looking for finialized changes or formula changes that have been approved by the administrator. If changes are found, all event groups affected by the changes are examined and event dates (2210) belonging to the affected event groups are altered if needed. The changes in the events are stored in an event maintenance log table (2212) with specific details about the changed events stored in an event maintenance change detail table (2214). A change notification module (2216) periodically polls the event maintenance log table looking for new log entries and uses that data along with the change detail data in the event maintenance change detail log to send notification e-mails 2218 to users regarding the changes made to the users events.

Figure 23:
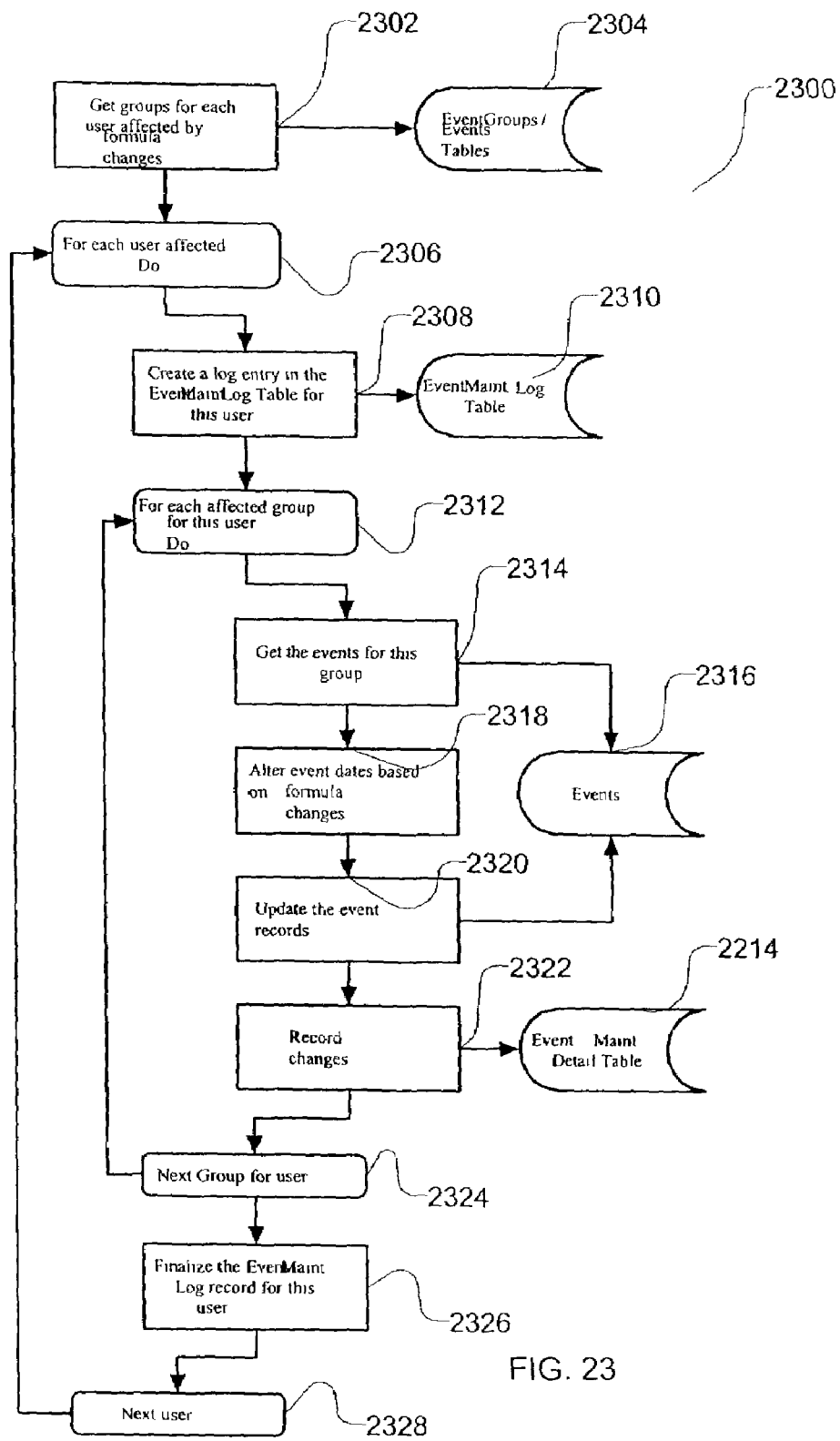
FIG. 23 is an event maintenance process as used by an event maintenance module in accordance with an exemplary embodiment of the present invention.

FIG. 23 is an event maintenance process as used by an event maintenance module in accordance with an exemplary embodiment of the present invention. An event maintenance process 2300 is the method used by an event maintenance Module to apply formula changes to events. The event maintenance process begins by getting (2302) event groups 2304 for each user that will be affected by changes made to formulas. The data for each group includes a user ID and a group ID of each group affected. The record set is ordered by user ID and group ID so that the groups for each user can be processed as a unit.

For each user (2306) the event maintenance process examines the events in the groups for additions, changes and deletions. Before processing the groups for a particular user ID, an entry is made (2308) in an event maintenance log table 2212 for the user. The data in this entry is used later by a change notification module to notify the user of date changes. After the log entry is made, the events in each group (2312) are examined and altered according to the formula changes. The event maintenance process gets (2314) the events 2316 for a group from the user database and alters (2318) the event dates based on the formula changes and updates (2320) the event dates in the user database. Each change made to an event in the group is recorded in an event maintenance detail table 2214.

After all groups (2324) for a user have been processed, the event maintenance log entry made earlier is "finialized" (2326) (the AllGroupsProcessed field is set) making it available to the change notification module (see the Change Notification Module topic below for details). After finalizing the previous user's changes, the groups for the next user (2328) are processed.

Figure 24:
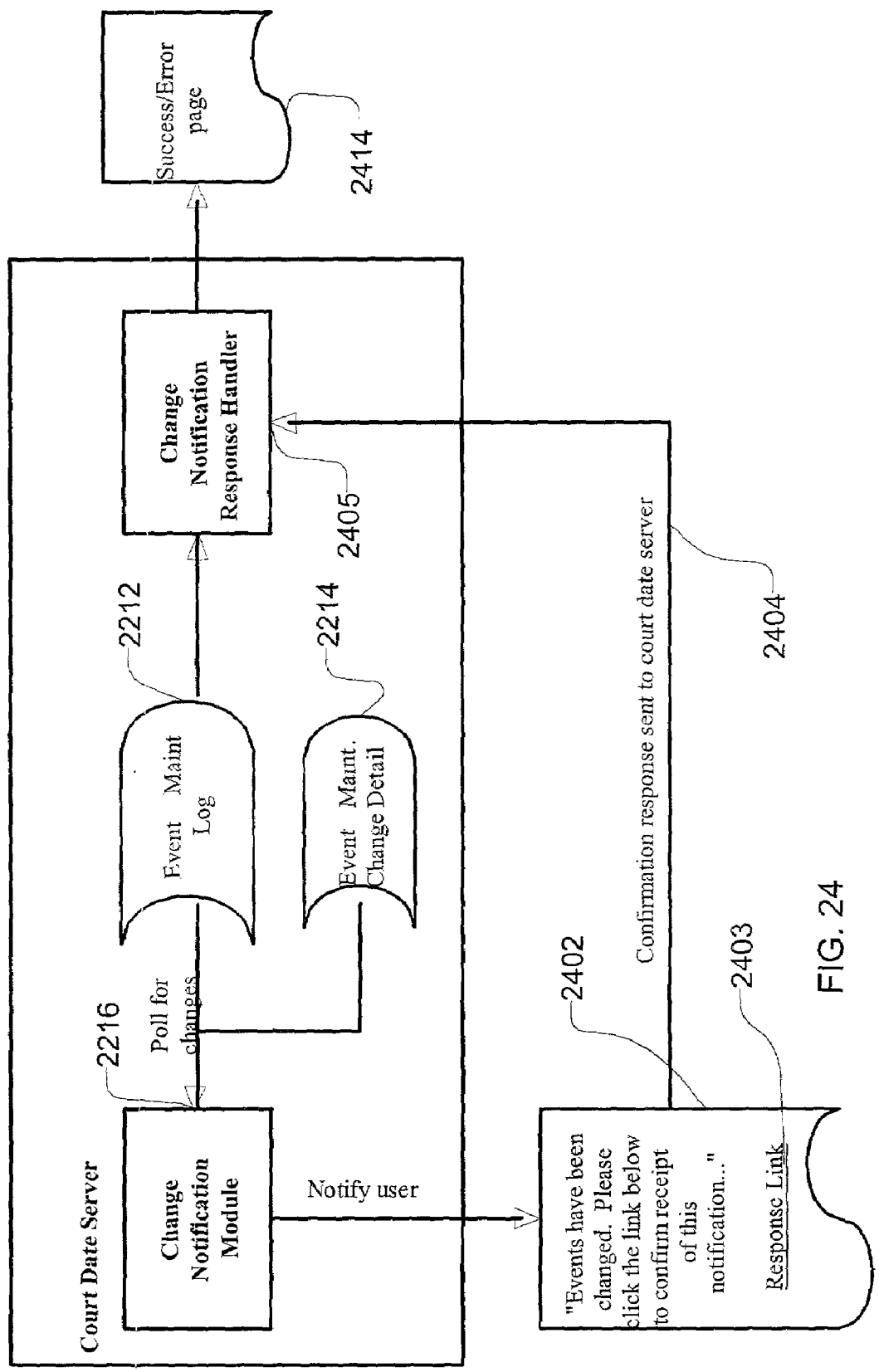
FIG. 24 is a block diagram of a change notification module in accordance with an exemplary embodiment of the present invention.

FIG. 24 is a block diagram of a change notification module in accordance with an exemplary embodiment of the present invention. Periodically, a change notification module 2216 checks an event maintenance log table 2212 for changes made to user events. For each user with a modified event, the change notification module uses the event maintenance change detail table 2214 to generate and send an e-mail 2402 to each user notifying them of the changes made to the user's events. The notification e-mail contains a "response" link 2403 that when selected sends a confirmation message 2404 to the court date server that indicates the user has received the notification e-mail.

A change notification response handler 2405 processes the confirmation message and updates the log record associated with the change notification e-mail sent to the user. The change notification response handler builds a response page 2406 that is returned to the user verifying that the confirmation of receipt was successful. If an error occurs during the update process, an error page is generated and sent to the user instead. An administrator periodically checks the event maintenance log table for log records whose notification e-mails have never been responded to and sends the corresponding users a letter that requests a written verification and/or the users' new e-mail address.

In one embodiment of a change notification module in accordance with an exemplary embodiment of the present invention, only a certain number of notification e-mails are sent for each log record. An administrator of a court date server periodically checks for all log records whose confirmation e-mails have never been responded to and send these users a notice via regular mail requesting written confirmation or the users new e-mail address. Also, each time a user logs into the court date Web site, the user receives a display with data about any e-mail notices that have not been responded to. The user is able to confirm receipt of the change notification at this time.

Figure 25:
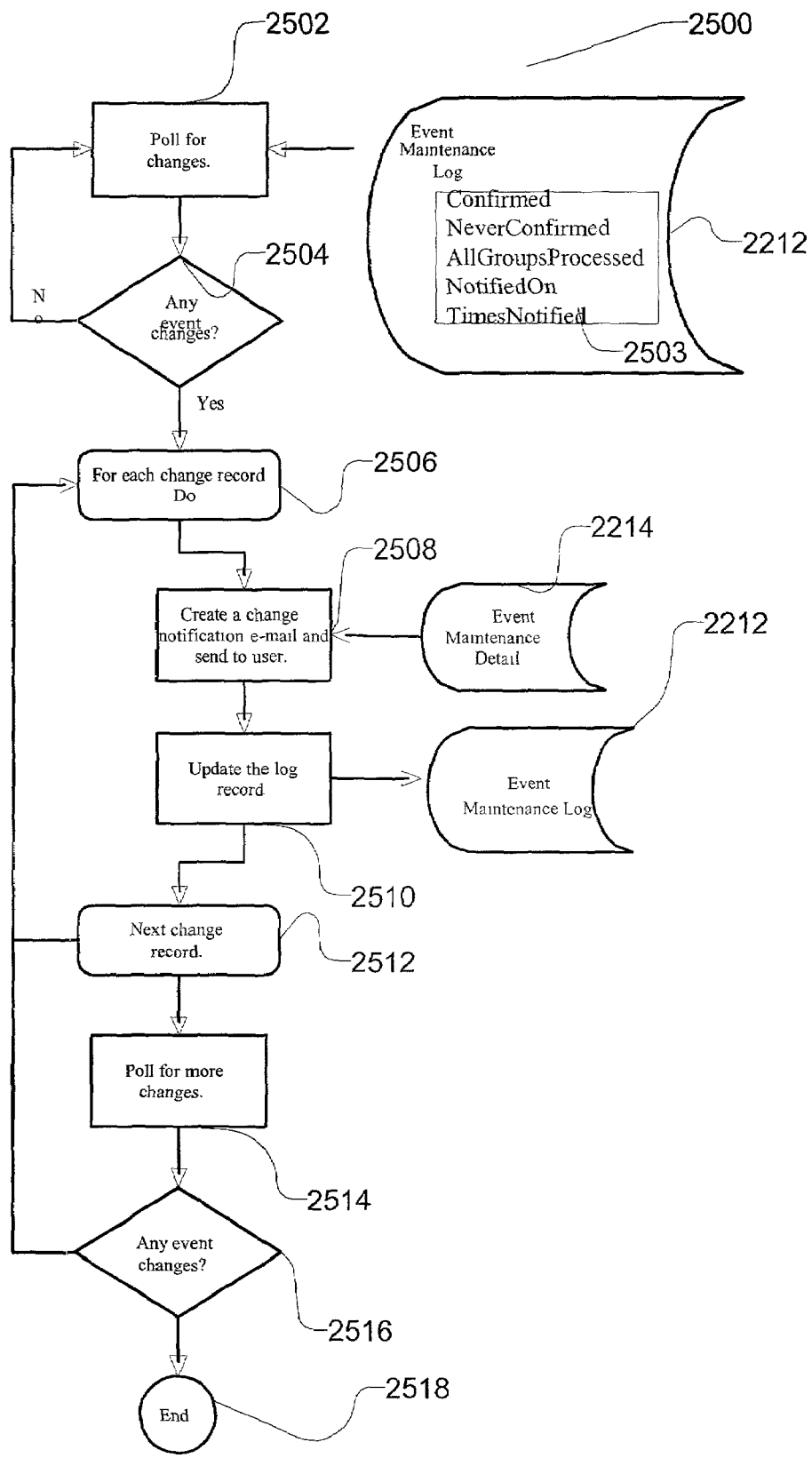
FIG. 25 is a change notification process in accordance with an exemplary embodiment of the present invention.

FIG. 25 is a change notification process in accordance with an exemplary embodiment of the present invention. A change notification process 2500 polls (2502) an event maintenance log table 2212 to see if any event changes need to be processed. An event maintenance log entry 2503 includes "Confirmed", "NeverConfirmed", "AllGroupsProcessed","NotifiedOn", and "TimesNotified" fields holding the status of notification of a user. The criteria used to determine if a log record needs to be processed is whether or not the "Confirmed" and "NeverConfirmed" fields are False, the "AllGroupsProcessed" field is True, and the period of time that has elapsed between the date the last notification was sent, as indicated by the "NotifiedOn", field and the current system date is greater than or equal to a specified notification period or a notification has never been sent for this log record.

If the change notification process determines (2504) that there are event date changes that a user needs to be notified about, then for each log record found (2506), the change notification process generates (2508) a change notification e-mail 2414 (of FIG. 24) for the user using the details of the changes associated with a log record in an event maintenance detail table 2214. The change notification e-mail includes the number of times the user has been notified and the last notification date. If this is the last notification, the change notification e-mail contains an appropriate message warning the user that no further notifications will be sent for this log record. The change notification process updates (2510) log records in the event maintenance log table 2212 upon successfully sending the change notification e-mail. The NotifiedOn field is set to the current system date and the TimesNotified count is incremented. Processing continues (2512) until all log records have been processed. Before completing the process, the change notification process polls the event maintenance log table to ensure that any log records added to the event maintenance log table during the notification process are processed. If the change notification process determines (2516) that no new changes have been made, the change notification process ends 2518. If otherwise, the change notification process processes each (2506) new change.

Figure 26:
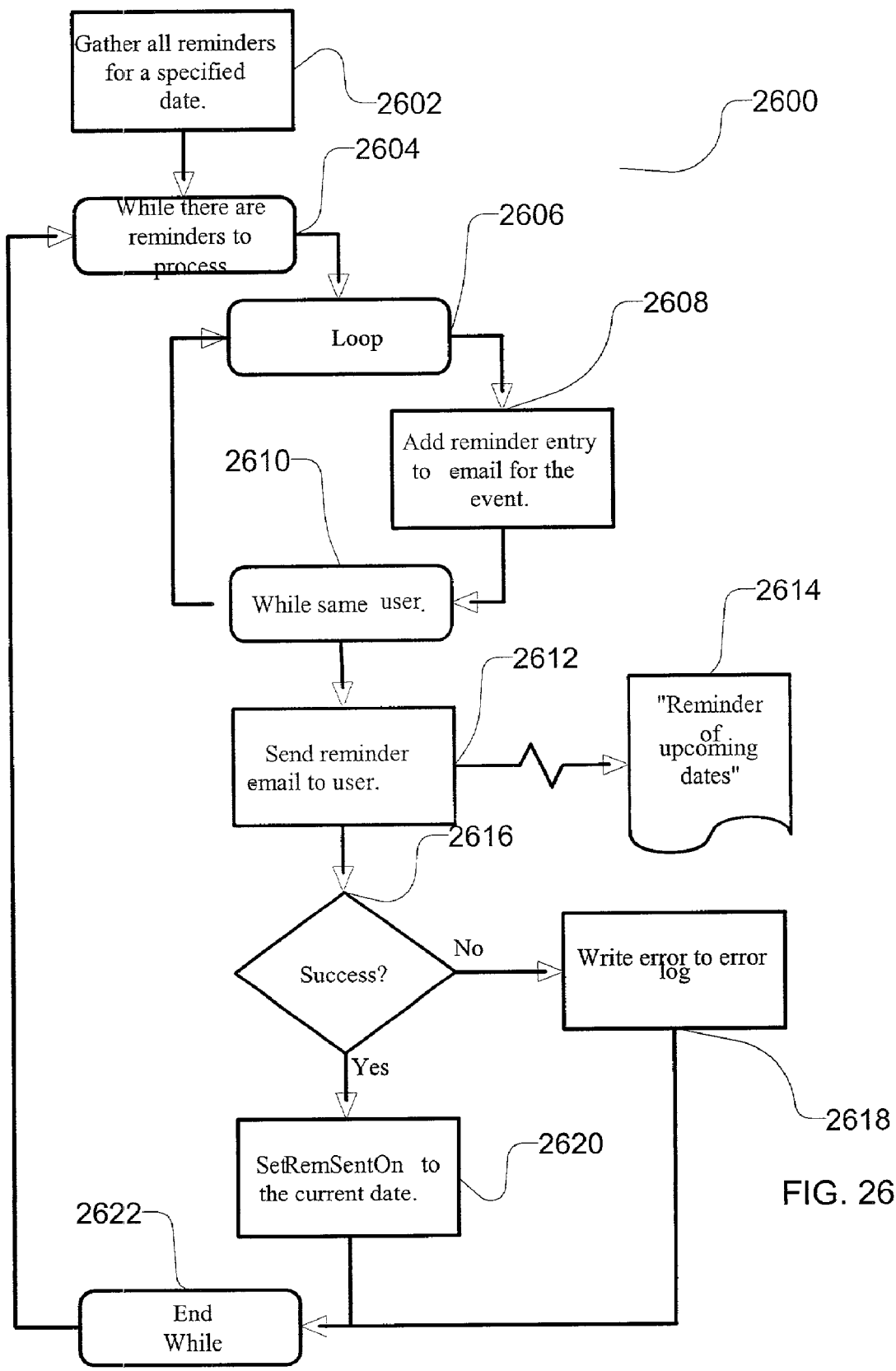
FIG. 26 is a reminder notification process in accordance with an exemplary embodiment of the present invention.

FIG. 26 is a reminder notification process in accordance with an exemplary embodiment of the present invention. A reminder notification process 2600 gathers (2602) all reminders for events on a specified date. The events returned are in order by user ID and reminder date. While there are reminders to process (2604), for each user (2606) the reminder notification process adds (2608) a reminder to a reminder notification e-mail message 2614. The reminder notification process adds all reminders for a single user (2610) to the reminder notification e-mail message and sends (2612) the reminder notification e-mail to the user. The reminder notification e-mail includes data about each event date that the user asked to be reminded of. If the reminder notification process determines (2616) that the reminder notification e-mail message is generated and e-mailed successfully, the reminder notification processes continues to process reminders while (2622) there are additional reminders for other users. If an error occurs, then an appropriate message is written (2618) to a reminder notification activity log. Processing continues in this fashion until all reminder e-mails have been sent.

Referring again to FIG. 2, a user is allowed to create aggregates of event dates into a "group". A group is an interrelated set of event dates. All event dates within a group have some relationship to at least one other event date in the group. Groups allow maintenance of the integrity of interrelated event dates. The court date server Web site includes a "Group Select" page 262 that allows a user to select a group for inclusion of an event.

Figure 15:
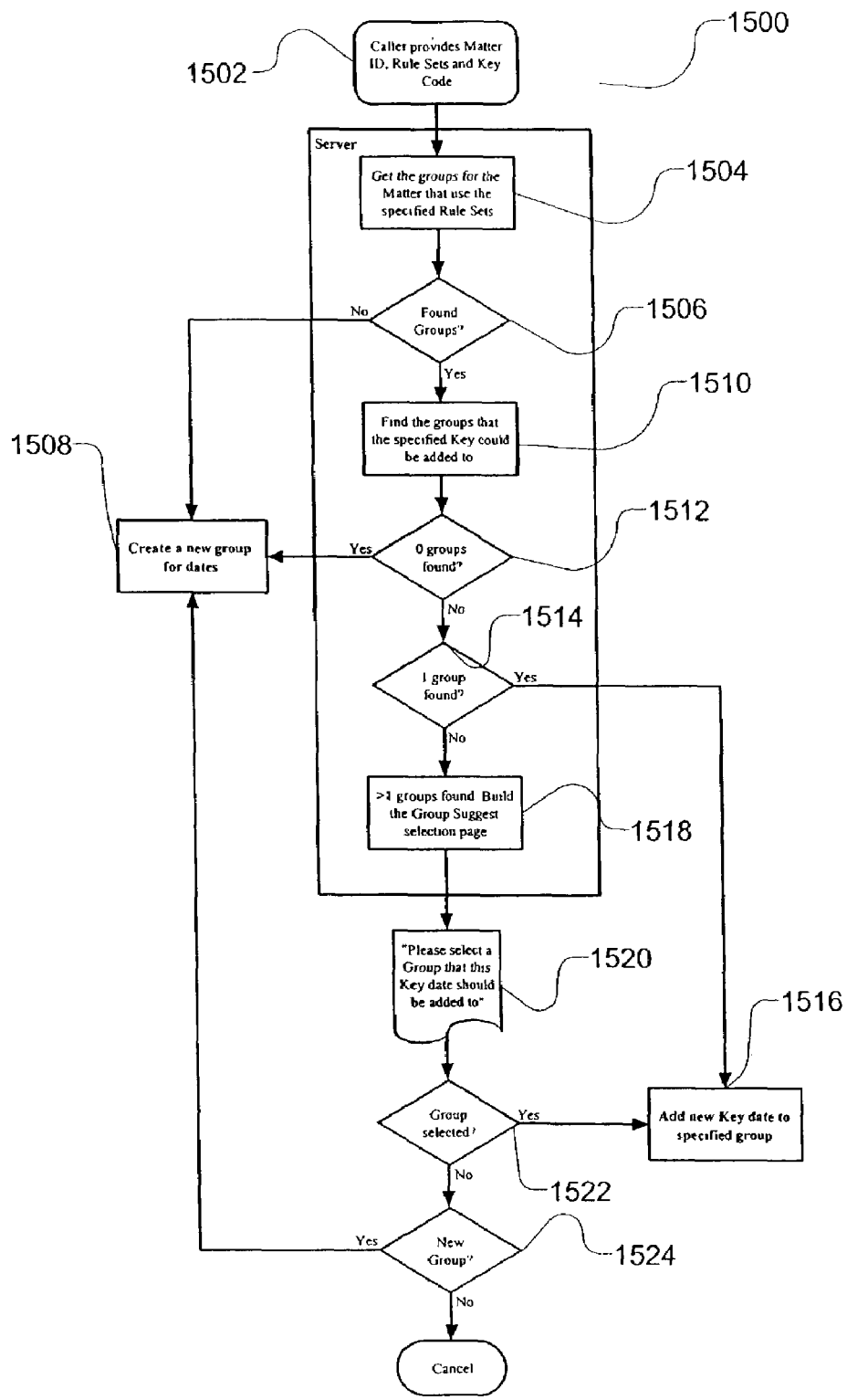
FIG. 15 is a group selection process in accordance with an exemplary embodiment of the present invention.

FIG. 15 is a group selection process in accordance with an exemplary embodiment of the present invention. A group selection process 1500 receives (1502) a matter ID, a rule set ID, and a key code. The group selection process gets (1504) groups for the matter that use the specified rule sets from the user database.

The group selection process determines (1506) if any groups were identified. If not, the group selection process creates (1508) a new group for the matter and groups the event dates specified by the key codes. If groups were identified for the matter, the group selection process finds (1510) groups to which the specified key codes should be added. The group selection process determines (1512) if any groups were found. If not, the group selection process creates a new group as previously described. If only a single groups was found (1514), the group selection process adds (1516) the new event date specified by the key code to the identified group. If more than one group is found, the group selection process builds (1518) a group selection page (1520) for use by the user to select a group to which the event dates specified by the key codes will be assigned. If group selection process determines (1522) the user selected a group, the group selection process adds (1516) the event dates to the selected group. If group selection process determines (1524) the user requested a new group to be created, group selection process creates (1508) a new group for the event dates. If the user has not either selected a group or requested a new group, group selection process exits (1526) without adding the new event dates to a group.

Referring again to FIG. 2, the court date server Web site includes a "Verify Events" page 262. The Verify Events page displays newly added events for a group as well as changes to related dates after the user changes a "trigger" date.

FIG. 16 is a Verify Events page in accordance with an exemplary embodiment of the present invention. A Verify Events page 262 is similar to the previously described Event List page with the following exceptions. Additions and changes are indicated in an "A/C" field 1600. The user may avoid a change by selecting a "Skip" link 1602. The user may also remove an addition by selecting a "Delete" link 1604. The user may also edit a note associated with the event by selecting a "Note" link 1606.

Selecting an "Accept" button 1608 accepts the additions and changes and returns the user to the page from which the addition or change was initiated. Selecting a "Cancel" button 1610 cancels the changes and selecting a "Print" button 1612 prints the displayed list.

Referring again to FIG. 2, the court date server Web site includes an "Event Maintenance Log" page 266. An event maintenance process makes changes to users event dates when the event dates' controlling formulas are changed. Each item in the list represents one event maintenance process. In other words, an event maintenance process was run because of changes to the rules and one or more of a user's dates where changed.

FIG. 17 is an Event Maintenance Log page in accordance with an exemplary embodiment of the present invention. An Event Maintenance Log page 266 includes a changed event date list 1700 of event dates that were changed by the event maintenance process. The event date list includes the following fields. A "Notified On" field 1702 includes a date and time of a last change notification sent to the user. A "Notifications" field 1704 includes the number of times the user has been notified of date changes before responding to a "Change Notification" e-mail. A "Log ID" field 1706 include a unique record ID of an event maintenance log entry. A "Changes" field 1708 includes a count of the number of events that were changed by the event maintenance process. A "Confirmed?" field 1710 includes a "Yes" once the user has responded to a "Change Notification" e-mail and a "No" otherwise. Each event maintenance log entry has a "Details" button 1712 next to it allowing the user to view changes made to events associated with an event maintenance log entry.

FIG. 18 is an Event Maintenance Detail page in accordance with an exemplary embodiment of the present invention. An Event Maintenance Detail page 268 displays detailed data for an event maintenance log entry. An ID 1800 of the event maintenance log record is displayed in a page description text at the top of the Event Maintenance Detail page. Each event maintenance log entry includes change data 1802 for one event. An event maintenance log entry change field 1804 includes a full description of the change.

Figure 19:
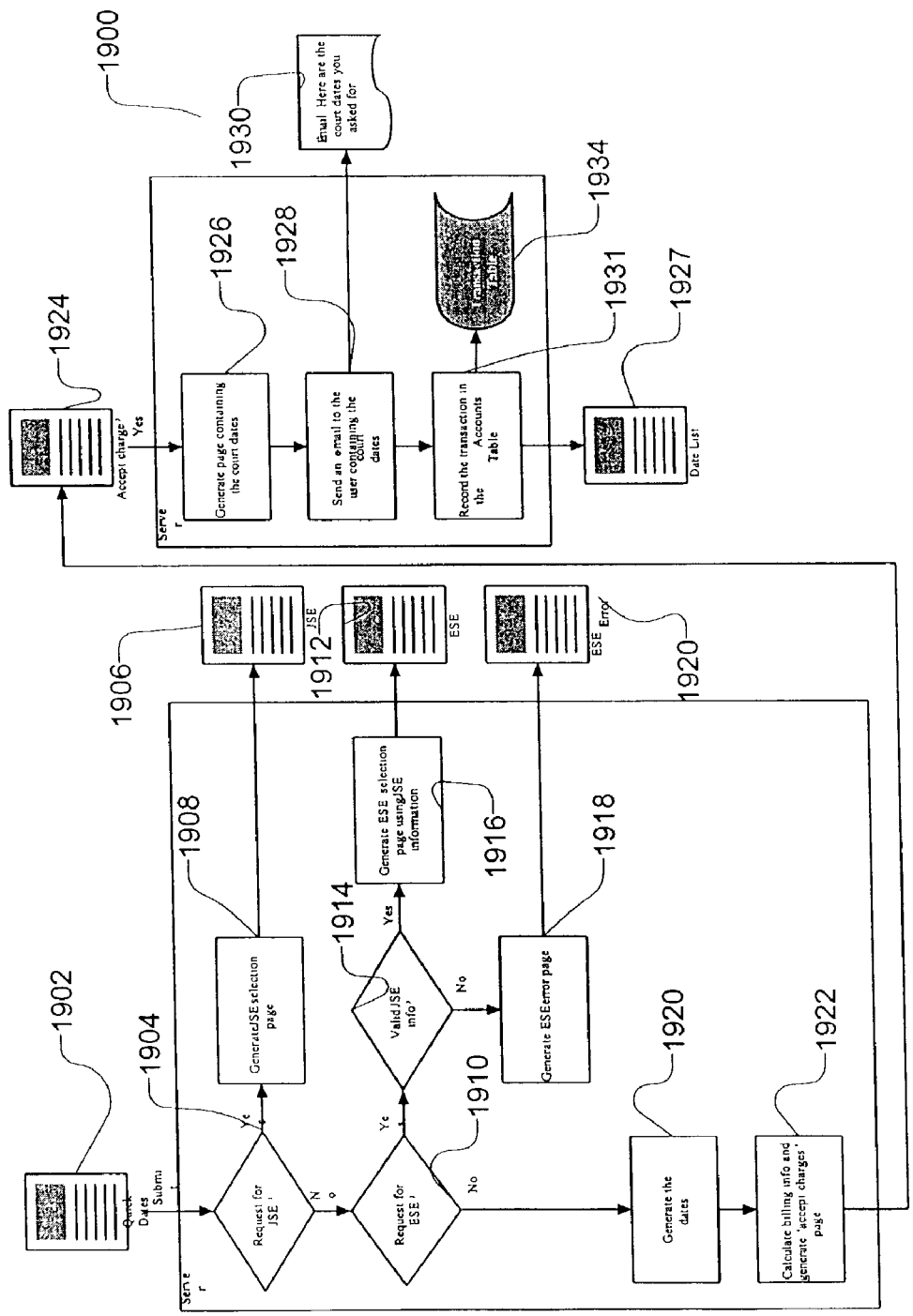
FIG. 19 is a process flow diagram of a "Quick Dates" process in accordance with an exemplary embodiment of the present invention.

FIG. 19 is a process flow diagram of a "Quick Dates" process in accordance with an exemplary embodiment of the present invention. A Quick Dates process 1900 option allows a user to generate dates that the user does not wish the court date server to store and track. The user enters enough data to generate court dates and receives a date list that the user can export to another application or print. The user also receives an e-mail including the dates. A "Quick Date Entry" page 1902 (also of FIG. 2) is used to gather data about the initial court date from the user. A user enters a valid jurisdiction by requesting 1904 the previously described Jurisdiction Expert 1906 to select from a list of valid jurisdictions generated (1908) by the court date server. The user requests (1910) an event to be scheduled using the previously described Event Selection Expert 1912 to display a list of valid events for the selected jurisdiction. The court date server generates the list of valid events by checking (1914) the selected jurisdiction and generating (1916) an event selection list. If the jurisdiction is invalid, the court date server generates (1918) an Event Selection Expert error page 1920. After providing jurisdiction and event data, the user enters a date and time of the event using a date and time selection menu. Selecting a "Submit" button transmits the event data to the court date server. If an error occurs, then the web service generates a descriptive error page and returns it to the user. The court date server generates (1920) event dates and calculates (1922) the appropriate charges for the generated dates.

The court date server asks (1924) the user if the user will accept the charges using a previously described event generation charges page. If the user accepts the charges, the court date server generates (1926) a list 1927 of event dates for transmission to the user. The court date server also generates (1928) and transmits to the user an e-mail (1930) including the generated event dates. At the end of the process, the court date server records (1931) the transaction in a transaction table 1934.

Referring again to FIG. 1, a court date server maintains a user database 106 of user data in order to track event dates for users and a schedule rules database 104 for storing scheduling rules of different courts. The databases include grouped tables allowing each database to reside on different servers thus reducing the workload of each server. For example, an Event Maintenance process can be running continually on the server that includes an "Event Maintenance" database without affecting the performance of a server dedicated to generating and storing court dates.

An accounts database includes tables used to store user account data. A master settings file for the entire court date server web site is also located in this database.

Table 1 is a Site Settings Table including settings that apply to the web site and can only be changed by an administrator of the court date server Web site.

TABLE 1

| Field | Description |
| --- | --- |
| MaxCngNotifs | Maximum number of date change notifications that will be sent to a user. |
| MaxEvListItems | Maximum number of events that can appear on the Event List. NULL = unlimited. |
| MaxMatters | Maximum number of matters per user. NULL = unlimited. |
| MaxEvents | Maximum number of events per user. NULL = unlimited. |
| DisableNotify | Disable the Event Change Notification process? |
| NotifyTime | Time at which the Event Change Notification process checks for event changes. |
| NotifyPeriod | Number of workdays that must elapse before another Event Change Notification e-mail is sent to the user. |
| ReminderTime | Time at which the Reminder Notification process checks for reminders. |
| ActivityLogLevel | Determines what data is written to an Activity Log table. |

Table entry "MaxCngNotifsDetermines" is a maximum number of change notification e-mails that will be sent to a user for each Event Maintenance Log record. When this value is reached, the sales department is notified and a letter is sent to the user requesting a written confirmation of the users new e-mail address.

Table entry "MaxEvListItems" is a maximum number of events that can appear on an Event List. Unlimited if set to NULL.

Table entry "MaxMatters" is a maximum number of matters allowed per user. Unlimited if set to NULL.

Table entry "MaxEvents"is a maximum number of events allowed per user. Unlimited if set to NULL.

Table entry "DisableNotify" disables an Event Change Notification process.

Table entry "NotifyTime" includes a time at which an Event Change Notification process begins sending change notification to users.

Table entry "NotifyPeriod" includes a number of days that elapse before subsequent Event Change Notification e-mails are sent for any change notifications that the user has not responded to.

Table entry "ReminderTime" includes the time at which a Reminder Notification process begins sending reminder e-mails.

Table entry "ActivityLogLevel" determines an amount of detail contained in all activity log tables. 0 (the default) writes just basic system data and errors to a log. Increasing this value increases the amount of detail contained in each log.

Table 2 is a Charges Matrix Table as used in an exemplary embodiment of the present invention to calculate charges for date calculations. The Charges Matrix Table includes amounts to charge for each rule set billing type for a number of dates generated and/or changed. When new dates are added, or dates in an existing group of dates are changed because of the addition of a new date, the court date server uses the Charges Matrix Table to determine how much to charge the user based on the number of additions and/or changes and the billing type of rule sets used. For example, if a new Key Date is added that generates 10 new events for a rule set of billing type 1, the user is charged $10. If a Key Date is added to an existing group of dates causing two (2) new dates to be added to the group and two (2) existing dates to be recalculated, the user is charged $5 if the rule set used has a billing type of 1, $2.50 for billing type 2 and $2.50 for billing type 3.

TABLE 2

| Field | Description |
|---|---|
| BillingType | Rule Set billing type. |
| NumAddsChgs | Upper limit for the number of changes/additions this record applies to. See below for an example of the data contained in this table. |
| Amount | Amount to charge. |

Table 3 is a User Accounts Table in accordance with an exemplary embodiment of the present invention. The User Accounts Table holds primary user account data.

TABLE 3

| Field | Description |
|---|---|
| CustID | Unique record ID. Primary key. |
| FirstName | User's first name. |
| LastName | User's last name. |
| EMailAddress | User's e-mail address. Also serves as the user login name. Date change notices and other e-mails are sent to this account. Contents are encrypted. |
| DOBMonth | Month part of date of birth. |
| DOBDay | Day part of date of birth. |
| DOBYear | Year part of date of birth. |
| Password | Users password. Contents are encrypted. |
| PasswordQ | Password question. This question is asked when the user has forgotten their password and needs us to e-mail it to them. Contents are encrypted. |
| PasswordA | Password answer. In order for us to e-mail the users password the user must provide the correct answer (this field) the Password Question. |
| NotifyChanges | Notify user when any of their dates are changed because of changes to the rules. |
| RemEmails | Send reminder e-mails? This option is "On" by default. |
| Inactive | Is this user record inactive? Can only be set by administrator. |
| OnMailingList | Has the user selected to be on our mailing list. Will receive data about Administrator products and special offers. |
| OtherMailing | Has the user selected to receive occasional third party product data? |
| SubscriptLevel | User subscription level. Determines which application functions can be accessed. NULL = all functions. |
| CorpAccount | Is this a corporate account? |

TABLE 3-continued

| Field | Description |
|---|---|
| CorpAccountID | This field will have the ID of the corporate account record if this user is part of a corporate account. |
| TrialPeriod | Number of days in user's trial period. |
| Credit | Allows us to apply a credit to the users account. |
| Discount | Percentage discount. 0 to 100 percent. |
| Visits | Number of times the user has logged into our site. |
| LastVistedOn | Date and time of last visit (log on) to our site. |
| AddedOn | Date and time record was added. |
| ChangedOn | Date and time record was last changed. |
| BillingType | Includes the billing type. Can be set to "Monthly statement" or "Bill credit card". The "Monthly statement" setting can only be used on corporate accounts. |
| CRCardType | Credit card type (American Express, Master Card, etc). |
| CRCardNumber | Credit card number. This field is 128-bit encrypted. |
| CRExpireMonth | Credit card expiration month. |
| CRExpireYear | Credit card expiration year. |

The Password, PasswordQ, PasswordA EmailAddress and CRCardNumber fields are 128-bit encrypted. The DOBMonth, DOBDay and DOBYear fields are used to authenticate the user before allowing the user to view their password question (PasswordQ).

The password question is asked when the user has forgotten their password and is requesting that the password be e-mailed to the user.

Table 4 is a Firm Information table in accordance with an exemplary embodiment of the present invention. The Firm Information table includes firm data associated with a user's account record. This data is used for product update notices, special offers from alliance partners and date change notifications.

TABLE 4

| Field | Description |
|---|---|
| ID | Unique record ID. Primary key. |
| CustID | User ID. Foreign key. |
| FirmName | Office name. Indexed. |
| Address1 | Mailing address line. |
| Address2 | Mailing address line. |
| City | City. Indexed. |
| StateProv | State or Province. Indexed. |
| ZipPCode | Zip or Postal Code. Indexed. |
| Country | Country code. Selected from a pulldown list. |
| Phone | Work phone number. |

The above table does not contain any primary contact or e-mail address data. This data is retrieved from an associated User Account table when needed. A Billing Information table includes alternate e-mail and contact data if this data is different than what is in the primary User Account/Firm Information tables.

Table 5 is a Billing Information Table includes billing data for a user. If no billing address data is provided then address data in the User Information table is used.

TABLE 5

| Field | Description |
| --- | --- |
| ID | Unique record ID. Primary key. |
| CustID | User ID. Foreign key. |
| BillingName | Billing name if different than FirmName in the Firm Information table. Indexed. |
| Attention | Attention name. |
| Address1 | Billing address line. |
| Address2 | Billing address line. |
| City | City. Indexed. |
| StateProv | State or Province. Indexed. |
| ZipPCode | Zip or Postal Code. Indexed. |
| Country | Contry code. Selected from a pulldown list. |
| Phone | Billing phone. |
| EMailAddress | Billing e-mail address. Encrypted. |

Table 6 is a Transaction Log Table used to track data about dates generated by a user each time the user generates dates.

TABLE 6

| Field | Description |
| --- | --- |
| TransID | Unique record ID. Primary key. |
| CustID | User ID. Foreign key. |
| DateTime | Date and time of the transaction. Indexed. |
| AmountBilled | Amount billed for this transaction. |
| NumDatesAdded | Number of dates generated by the transaction. If the user added dates to an existing group then this number is the number of new dates added to the group. |

The court rule database includes tables used to schedule court deadlines. The court rule database further includes data used by the JSE and ESE. Table 7 is a Rule Sets table including data about each rule set in the court rule database.

TABLE 7

| Field | Description |
| --- | --- |
| Code | Rule set code. |
| RSType | Is this a System or User rule set? |
| Active | Is this rule set active? |
| CurrentAsOf | Update date for the rule set. |
| AccessCode | Rule set activation code. |
| CreatedOn | Date the rule set was created. |
| NextFormulaID | Next available formula ID for this rule set. |
| ChangeEvData | Change event data? |
| UseGlobalSettings | Use the global event maintenance settings? |
| ProcessCompleted | Process completed events during event maintenance? |
| AddNewEvents | Add new events if needed during event maintenance? |
| AlterIfDateChanged | Alter events if the due date has been changed by the user? |
| Cutoff Date | Event Maintenance cutoff date. |
| Description | Rule set description (name) |
| ExpertData | Jurisdiction Selection Expert data. |

Table 8 is a Formulas table as used in an exemplary embodiment of the present invention. The Formulas table includes formulas for each rule set in the court rule database.

TABLE 8

| Field | Description |
| --- | --- |
| RuleSet | Rule set containing this formula. |
| FormulaID | Unique ID of the formula within the rule set. |
| Ftype | Type of formula: Trigger or Related. |

TABLE 8-continued

| Field | Description |
| --- | --- |
| Category | Category code. |
| Priority | Priority code. |
| Authority | Authority text. |
| UpdatedOn | Last updated on this date. |
| Description | Formulas description. Can be up to 1024 characters. |
| ExpertData | Event Selection Expert data (trigger formulas only). Can be up to 1024 characters. |
| Script | Formula calculation script. Can be up to 4096 characters. |

When a formula is added or changed, a Formula Relationship table is updated to include appropriate scheduling data. Table 9 is a formula relationship table in accordance with an exemplary embodiment of the present invention. A Formula Relationship table includes relationship data for each formula in the court rule database. The relationship data is used to track which formulas are scheduled when a particular trigger formula is scheduled allowing retrieval of data for scheduling and display purposes.

TABLE 9

| Field | Description |
| --- | --- |
| RuleSet | Rule set containing the formula. |
| FormulaID | Unique ID of formula within the rule set. |
| Trigger | If the formula is a "trigger" formula then its trigger code is placed here. |
| Related | The trigger code of the relationship is placed in this field. |

When a formula is saved, entries are made in the Formula Relationship table and the formula script is evaluated for relationships with other formulas. If relationships are found, an entry is made in the Formula Relationship table for each relationship.

There are a few scenarios that are handled to create an accurate relationship table:

Scenario 1—Single Trigger Relationship

RESULT=CALCDATE 30 DAYS BEFORE TRIGGER $TR

In this scenario, a "Related" formula calculates a date that is 30 days before the $TR trigger date. This relationship is a one-to-one relationship. For example, if the ID of the formula is "CA:LA-FT-123", the table entry would look like this:

| Rule Set | Formula ID | Trigger | Related |
| --- | --- | --- | --- |
| CA: LA-FT | 123 | NULL | $TR |

The formula is included when scheduling a $TR trigger date is scheduled because "$TR" is in the "Related" Field.

Scenario 2—Multiple Trigger Relationship

D1=CALCDATE 35 DAYS BEFORE TRIGGER $TR

D2=CALCDATE 70 DAYS AFTER TRIGGER $TS

RESULT=LATER D1, D2

In this scenario a "Related" formula bases the formula's calculation off more than one trigger date. In this case the formula uses the $TR and $TS trigger dates for the formula's calculation. For example, if the ID of the formula is "CA:LA-100", the table entries would look like this:

| Rule Set  | Formula ID | Trigger | Related |
|-----------|------------|---------|---------|
| CA: LA-FT | 100        | NULL    | $TR     |
| CA: LA-FT | 100        | NULL    | $TS     |

When the $TR trigger date is scheduled, this formula will be included because it references $TR in "Related" Field for the first entry in the table.

Scenario 3—Single Related Relationship

RESULT=CALCDATE 10 DAYS BEFORE RELATED CA:LA-FT-123

This calculation is based on a specific related formula (formula "CA:LA-FT-123"). In this case, the court date server resolves the formula ID into a trigger code before making an entry in the Formula Relationship table. The formula referenced by the calculation above is examined to determine if it can be resolved into a trigger code. If the specified formula cannot be resolved into a trigger code (because it also bases its calculation on a specific related formula) then an attempt is made to retrieve the trigger code from the formula that it references. This continues until the trigger code is found. If no "Trigger Code" is found then no date is calculated for the formula (this could occur if the "CA:LA-FT-123" formula is deleted). For example, the "CA:LA-FT-124" formula bases its date calculation off the $TR trigger formula. In this case, the resolution of the "Trigger Code" would be $TR and the table entry would look like this:

| Rule Set  | Formula ID | Trigger | Related |
|-----------|------------|---------|---------|
| CA: LA-FT | 40         | NULL    | $TR     |

Note that the related formula used by the date calculation script is in the same rule set as the formula being calculated.

As another example, if the related formula used for the calculation bases its calculation off more than one trigger date, such as "CA:LA-FT-123", the date calculation is as follows:

D1=CALCDATE 35 DAYS BEFORE TRIGGER $TR

D2=CALCDATE 70 DAYS AFTER TRIGGER $TS

RESULT=LATER D1, D2

In this case the following entry would be made in the relationship table as:

| Rule Set  | Formula ID | Trigger | Related |
|-----------|------------|---------|---------|
| CA: LA-FT | 100        | NULL    | $TR     |
| CA: LA-FT | 100        | NULL    | $TS     |

Scenario 4—Branching Trigger

A "Branch Trigger" is a trigger whose date can either be provided by the user when the trigger is scheduled or can be scheduled when another trigger date is scheduled. For example, a "Discover Cutoff" date can be scheduled by itself or as part of a trial. In this case, the calculation for the "Discover Cutoff" trigger formula looks like this:

RESULT=CALCDATE 30 DAYS BEFORE TRIGGER $TR

The table entry for this formula looks like this (assuming a formula ID of "CA:LA-FT-32"):

| Rule Set  | Formula ID | Trigger | Related |
|-----------|------------|---------|---------|
| CA: LA-FT | 32         | $DC     | $TR     |

In the case where the "Branching Trigger" formula bases its calculation on more than one trigger formula the following would be added to the table ("TRIGGER $TR" and "TRIGGER $XX" are referenced by the formula):

| Rule Set  | Formula ID | Trigger | Related |
|-----------|------------|---------|---------|
| CA: LA-FT | 32         | $DC     | $TR     |
| CA: LA-FT | 32         | $DC     | $XX     |

Scenario 5—Trigger Formula

In this scenario the trigger formula does not contain a calculation script. The user must provide the date when the trigger is scheduled. In this case the table entry looks like this:

| Rule Set  | Formula ID | Trigger | Related |
|-----------|------------|---------|---------|
| CA: LA-FT | 1          | $TR     | NULL    |

A "delete" trigger on the Formulas table handles deleting entries in this table when a formula is deleted.

A Rule Set Type table includes billing types for each rule set. A billing type is used to access an additional charge when generating dates using a particular rule set. Table 10 is a Rule Set Type table in accordance with an exemplary embodiment of the present invention.

TABLE 10

| Field | Description |
|-------|-------------|
| RuleSet | Rule set code. |
| BillingType | This is the rule sets billing type value. This value is used to look up any additional amount to charge when dates are generated using a particular type of rule set. |

A Formula Changes Index table includes an entry for each change made to a formula. When an administrator of a court date server adds, changes or deletes a formula, an entry is made in the Formula Changes Index for the change. The previously described Event Maintenance process uses the data in the Formula Changes Index table to process existing events for formula additions, changes or deletions. Table 11 is a Formula Changes Index table in accordance with an exemplary embodiment of the present invention.

TABLE 11

| Field | Description |
| --- | --- |
| URI | Unique record ID. Numeric identity field. |
| ChangeType | Type of change made to the formula. 0 = Undefined, 1 = Added, 2 = Changed, 3 = Corrected, 4 = Deleted. |
| Finalized | Setting this field "finalizes" the change essentially releasing the change to the Event Maintenance Process. |
| Processed | Has Event Maintenance finished processing this change? |
| AddedOn | The date and time the index record was added to the table. |
| AddedBy | The user that made the formula change that caused an entry to be made in this table. |
| ProcessedOn | Date and time Event Maintenance finished applying this change to existing events. |
| RuleSet | Rule set code. This field and the FormulaID field below comprise the unique formula ID. |
| FormulaID | Unique ID within the rule set specified by the RuleSet field. |

A formula changes detail table (not shown) includes formula records for each change made to a formula. It's structure is identical to the previously described formulas table structure except that the constraint on duplicate formula ID's is removed.

A docket data database includes user matter and calendar data. A matters table includes matters added by a user. Matters can be added to this table when generating dates or from the user's administration page. Table 12 is a matters table in accordance with an exemplary embodiment of the present invention.

TABLE 12

| Field | Description |
| --- | --- |
| MatterID | Identity field. |
| CustID | User ID. |
| MatterName | Name of the matter. |
| DocketID | Docket ID. |
| MatterType | Matter type code. |
| RuleSets | Comma delimited list of default rule sets. Assigned by selecting the Venue from the Jurisdiction Selection Expert. |
| DateOpened | Date the matter was opened. |
| DateClosed | Date the matter was closed. |
| Inactive | Matter is no longer active. Any attempt to use this matter results in an error. |
| DeletedOn | The date the user deleted this matter. Delete matters older than a certain period of time are periodically removed from the database. |

A Matter Formulas table includes special matter date calculation formulas that are applied to certain types of formula calculations. Table 13 is a Matter Formulas table in accordance with an exemplary embodiment of the present invention.

TABLE 13

| Field | Description |
| --- | --- |
| MatterID | Identity field. |
| FormulaTag | Tag string. For example, this field would contain the tag "MOTION" if the formula is applied to motion dates. |
| Script | Includes the date calculation script. Can be up to 4096 characters. |

An Event Group table includes event groups generated by users. Table 14 is an Event Group table in accordance with an exemplary embodiment of the present invention.

TABLE 14

| Field | Description |
| --- | --- |
| GroupID | Unique record ID. Primary key. |
| MatterID | Matter ID. Foreign key. |
| RuleSets | Comma delimited list of rule sets used. |
| AddedOn | Date and time the group was added. Indexed. |
| LastChangedOn | Date and time the group was last changed. Indexed. |

An Events table stores the dates generated by a user. Each record in the Events table is linked to an Event Group record via a GroupID entry. Table 15 is an Events table in accordance with an exemplary embodiment of the present invention.

TABLE 15

| Field | Description |
| --- | --- |
| ID | Identity field. Primary key. |
| GroupID | Event Group ID. Foreign key linked to the Event Group Table. |
| RuleSetUsed | Rule set used to schedule this date. Indexed. |
| FormulaID | ID of the formula within the specified Rule Set. Indexed. |
| EventDate | Event date. Indexed. |
| StartTime | Event start time. |
| EndTime | Event end time. |
| Reminder | Send a reminder e-mail on this date. |
| RemSentOn | Date a reminder e-mail was sent to the user. |
| Complete | Has the event been completed? |
| Skipped | Has the event been skipped by the user? |
| DontChange | Never change this date even if the rules change. The user can set this and it is also set if the date or time is changed from its originally calculated date or time. |
| DeletedOn | Date the user deleted this event. Deleted events are periodically removed from the database by administrator. |
| Note | Variable length note field. Up to 1024 characters. |

An event maintenance database includes tables used to track event date change data and user notification data. If any user dates are changed during an Event Maintenance process, a master entry is made in an Event Maintenance Log table and the changes associated with the master entry are written to an Event Maintenance Detail table. These tables are later used to notify users of changes to their dates.

Table 16 is an Event Maintenance Log table in accordance with an exemplary embodiment of the present invention.

TABLE 16

| Field | Description |
| --- | --- |
| LogID | Identity field. Primary key. |
| CustID | User ID (link to the Account table). Foreign key. |
| ChangedOn | Date and time the changes where made (the date the log entry was added to the table). |
| NotifiedOn | Date user was notified of any changes made to any of their dates. |
| TimesNotified | How many times the user has been notified about this change. |
| Confirmed | Has the user confirmed notification of changes? Confirmation is performed by returning the notification e-mail to administrator. |
| AllGroupsProcessed | Have all the event groups effected by Event Maintenance for this user been processed? |

TABLE 16-continued

| Field | Description |
| --- | --- |
| NeverConfirmed | Set to True if the user never confirms any of the notification e-mails. |
| NumChanges | Number of changed records. |

Table 17 is an Event Maintenance Detail table in accordance with an exemplary embodiment of the present invention.

TABLE 17

| Field | Description |
| --- | --- |
| LogID | Event Maintenance Log record ID. Foreign key used to link to the ID field of the Event Maintenance Log table. |
| EventID | Event ID (link to the Event table). Foreign key. |
| Changes | This field includes the detail of the changes made. Each change is described in one sentence. For example "Date changed from Feb. 10, 2002 to Feb. 9, 2002". |

Court schedule rules are defined within a court date server using a Date Calculation Scripting Language (DCSL). DCSL includes statements used to calculate court date according to rules defined by the courts. DCSL is designed to be as flexible as possible allowing for all current, and future, date calculation requirements.

DCSL allows the use of Formula Variable arrays by a formula calculation. The Formula Variable arrays are created when a formula is calculated and destroyed when the formula has completed. The scope of the Formula Variables are local to the currently executing formula. In addition, a formula has the following variables it can use during its script execution.

| Variables | Description |
| --- | --- |
| RESULT | A date variable that includes a result of a formula calculation. Initialized to 0 (EMPTY) before the script executes. |
| D0 . . . DF | 16 date variables. Can be used to store any valid date value. |
| I0 . . . I9 | 10 Integer variables. Can store a number in the range −2,147,483,648 to 2,147,483,647. |

A "Date Calculation Expression" is a text string that includes data on how to calculate a date and has the following format:

| {amount} {unit} {direction} {event} | |
| --- | --- |
| Where: | |
| {amount} | Number of units to calculate. |
| {unit} | Calculation unit. [HOURS | COURTHOURS | DAYS | COURTDAYS | WEEKS | MONTHS | YEARS]. |
| {direction} | Direction of calculation. [BEFORE | AFTER] |
| {event} | A target date (event) on which to base the calculation. [TRIGGER | RELATED] [Key Code | Formula ID]. |

The "Date Calculation Expression" is used when calculating the date of a formula. For example:

RESULT=CALCDATE 21 DAYS BEFORE TRIGGER $TR

In this example, the result of a formula calculation (the RESULT variable) is set to a date that is 21 (offset) days (units) before (direction) the trigger date $TR (Date of Trial is the target or base date).

DCSL includes the following statements:

An "ADD" statement adds two integers. The ADD syntax is:

ADD {integer1}, {integer2 }

An "ADJUST" statement is used to adjust a date a specified number of units in the specified direction. Calculations using COURTHOURS and COURTDAYS units are guaranteed to fall on a court workday. For all other unit settings, use the ADJUSTHOLIDAY statement to ensure that the calculated date falls on a valid court day. The ADJUST syntax is:

| ADJUST {date variable} {direction} {amount} {unit} | |
| --- | --- |
| Where: | |
| {date variable} | A valid date variable. |
| {direction} | Direction of adjustment from the calculated date [FORWARD | BACKWARD] |
| {amount} | Number of units to calculate. |
| {unit} | Calculation unit. [HOURS | COURTHOURS | DAYS | COURTDAYS | WEEKS | MONTHS | YEARS]. |

An "ADJUSTDOW" statement adjusts a date to a specified day of the week. Adjustments that use a CONTINUE option are guaranteed to fall on a court workday. The syntax of the ADJUSTDOW statement is:

| ADJUSTDOW {date variable} TO {direction} {dow} [WITH {options}] | |
| --- | --- |
| Where: | |
| {date variable} | A valid date variable or string date. |
| {direction} | DOW adjustment direction. [PREVIOUS | NEXT] |
| {dow} | Day of Week adjustment setting. [MONDAY | TUESDAY | WEDNESDAY | THURSDAY | FRIDAY | SATURDAY | SUNDAY] |
| {options} | Optional adjustment options. Currently only CONTINUE is supported. The CONTINUE option "continues" the DOW adjustment to the next/previous day of the week if the adjusted date falls on a court holiday. |

An "ADJUSTHOLIDAY" statement adjusts the specified date to the next or previous court workday. The rule set's holiday list is used to perform this adjustment. The syntax of the ADJUSTHOLIDAY statement is:

| ADJUSTHOLIDAY {date variable} TO {direction} COURTDAY | |
| --- | --- |
| Where: | |
| {date variable} | A valid date variable or string date. |
| {direction} | Direction of adjustment. [NEXT | PREVIOUS]. |

An "ADJUSTSPECIAL" statement is used to apply adjustments defined at the matter level. For example when a judge assigned to a matter only hears motions on Mondays. A calculation formula can be created for a matter so that when a "Motion" date is calculated the matter formula for "Motion" can be used to adjust the calculated date. A current unique Matter ID is used when retrieving the calculation formula from the appropriate table for the matter. Each date calculation session has a unique Matter ID which allows this statement to retrieve the adjustment formula from matter data. The unique Matter ID is referred to as a "Matter Context". If no matter context exists, or no special formula is found for the specified "tag", the date is not changed. The statement simply returns the date that was passed to it in the {date variable} argument. The syntax of the ADJUSTSPECIAL statement is:

| ADJUSTSPECIAL date variable} {"tag"} | |
|---|---|
| Where: | |
| {date variable} | Any valid date variable or string date. |
| {"tag"} | Tag indicating which special formula to use for the matter when adjusting the date. |

An "ADJUSTWMY" statement is used to adjust a date to the beginning or end of the week, month or year the date falls within. The adjusted date is not guaranteed to fall on a court workday. The syntax of the ADJUSTWMY statement is:

| ADJUSTWMY {date variable} TO {direction} OF {unit} | |
|---|---|
| {date variable} | A valid date variable or string date. |
| {direction} | Adjustment direction. [BEGINNING \| END] |
| {unit} | Unit adjustment setting. [WEEK \| MONTH \| YEAR] |

An "ASSIGNMENT" satement (=) assigns a variable a value.

A "CALCDATE" statement calculates a date based on another date. If the date on which the calculation is based has not yet been calculated then that date is first calculated and the execution of the CALCDATE statement continues. The CALCDATE statement does not adjust the calculated date for court holidays if the calculation is not based on the COURTHOURS or COURTDAYS units. DCSL does not allow circular formula references. The syntax of the CALCDATE statement is:

| CALCDATE {calculation} | |
|---|---|
| Where: | |
| {calculation} | A valid date calculation expression. |

EXAMPLE 1:

RESULT=CALCDATE 21 DAYS BEFORE TRIGGER $TR

This example calculates a date 21 days before the trigger date specified by the $TR key code and assigns it to RESULT. The resultant date is not guaranteed to be a court workday.

EXAMPLE 2:

D1=CALCULATE 21 DAYS BEFORE TRIGGER $TR

D1=ADJUSTHOLIDAY D1 TO PREVIOUS WORKDAY

This example is the same as example 1 except that it adjusts the date in D1 to the previous court workday.

EXAMPLE 3:

RESULT=CALCDATE 30 COURTDAYS BEFORE TRIGGER CA:LA-FT-76

This example calculates a date 30 court days before the specified trigger date (using its formula ID) and assigns the result to the RESULT variable.

EXAMPLE 4:

D1=CALCDATE 15 DAYS BEFORE RELATED CA:LA-FT-99

This example calculates a date 15 days before the date calculated by the specified related formula and stores it in D1. D1 is not adjusted for court holidays.

EXAMPLE 5:

D1=CALCDATE 21 DAYS BEFORE TRIGGER $TR

D1=ADJUST D1BACKWARD 2 COURTDAYS

This example adjusts the date in D1 backward 2 court days.

A "COMPLETE" statement is used to complete the dates calculated using specified formulas. Whether or not the event is actually marked "completed" when this statement executes depends on how a user's "Auto complete events" option is set. The syntax of the COMPLETE statement is:

| COMPLETE {note} {formula list} | |
|---|---|
| {note} | A notation assigned to the dates marked completed by this statement. |
| {formula list} | List of formula Ids whose dates you wish to mark completed. |

A "DATEDIFF" statement is used to get the difference in days between two dates. The order of the dates doesn't matter. "date1" could be greater than or less than "date2". The syntax of the DATEDIFF statement is:

DATEDIFF {date1}, {date2 }

A "DELETE" statement is used to delete the dates calculated using the specified formulas. The syntax of the DELETE statement is:

| DELETE {note} {formula list} | |
|---|---|
| Where: | |
| {note} | The notation assigned to the dates marked deleted by this statement. Can be up to 80 characters. |
| {formula list} | List of formula Ids whose dates you wish to delete. |

An "EARLIER" statement returns the earlier of the dates in a list of date variables. The syntax of an EARLIER statement is:

```
EARLIER {date var list}
Where:
    {date var list}    List of date variables to compare.
                       Can contain any number of valid
                       date variables.
```

An "EXIT" statement is used to statement to exit a formula before the formula has completed execution. The syntax of an EXIT statement is:
EXIT A "GETDATE" statement is used to retrieve the date of an event whose calculation is based on the specified formula. If the date for the specified formula has not been calculated, this statement causes the specified formula to calculate the date. The syntax of a GETDATE statement is:

```
GETDATE {date variable} {type} {formula id | key code}
Where:
    {date variable}        A valid date variable.
    {type}                 Type of date. [TRIGGER |
                           RELATED].
    {formula id | key      Any valid formula id or key
    code}                  code. [formula id | key code]
```

A "GETDATE" statement sets the date variable D1 to the date calculated by the specified related formula. The syntax of a GETDATE statement is:
GETDATE D1 TRIGGER $TR An "IF THEN" statement is used to perform an action conditionally. The syntax of the IF THEN statement is:

```
IF {condition} THEN {action block}
Where:
    {condition}        The condition clause. The
                       values compared must be the same
                       type. [> | < | != | = | >= |
                       <=].
    {action            Includes an action statement or
    block}             statements. If more that one
                       statement you must bracket the
                       action block with BEGIN . . . ENDIF.
```

Another form of the IF THEN statement is:

```
IF [NOT] EXISTS {type} {formula id} THEN {action block}
Where:
    {type}             Type of date. [TRIGGER |
                       RELATED].
    {formula id}       Any valid formula id or key
                       code. [formula id | key
                       code]
    {action block}     Action or action block.
```

This condition statement is used to perform an action if a date exists for the specified formula. The optional NOT can be used to test if a date does not exist.

A "LATER" statement returns the later of the dates in a list of date variables. The syntax of the LATER statement is:
LATER {date var list}
Where:
    {date var list} List of date variables to compare.

A "NOTAPPLICABLE" statement is used to mark a date as "not applicable". This means that the addition of some other date has made the dates specified in the statement unnecessary. The syntax of a NOTAPPLICABLE statement is:

```
NOTAPPLICABLE {Note} {formula list}
Where:
    {Note}             The notation assigned to the
                       dates marked "Not Applicable" by
                       this statement.
    {formula list}     List of formula Ids whose dates
                       you wish to mark as "not
                       applicable".
```

A "REM" statement adds a comment to the formula calculation script. The syntax of a REM statement is:

```
REM {comment text}
Where:
    {comment text} Message text string.
```

A "SUBTRACT" statement is used to subtract two integers. Integer 2 is subtracted from Integer1. The syntax of a SUBTRACT statement is:
SUBTRACT {integer1}, {integer2 }

According to one embodiment of the invention, "Court Day" calculations may be performed via the function in table 18. The date calculated is guaranteed to fall on a regular court workday based on the court holiday list provided in the <Holidays> parameter.

TABLE 18

Function ClawCalcCourtdays(const ClawDateTime: TClawDateTime; const nDays: integer; Holidays: THolidays): TClawDateTime;
    Declare nDirection as integer;
    Declare lCourtDays as longint;
    Declare DateRslt as TClawDateTime;
    Set nDirection to 1;
    If <nDays> is less than 0 then
        Set nDirection to −1;
    End If
    Set DateRslt to the contents of <ClawDateTime>;
    Set lCourtDays to the absolute value of <nDays>;
    While lCourtDays is greater than 0 do
        Set DateRslt.Date to DateRslt.Date + nDirection;
        If DateRslt.Date is a court work day then
            Decrement lCourtDays by 1;
    EndWhile;
    Set the function result to the contents of DateRslt;

A pseudocode of the "ClawDateCalculation" function is listed in table 19. This function calculates a date based on the parameters provided and returns the date and time as a TClawDateTime. Only dates calculated using the kuCOURTHOURS or kuCOURTDAYS units are guaranteed to fall on a court workday. The <ClawDateTime> parameter contains the "base" date from which to calculate the date. <nAmount> contains the number of units to add or subtract from the date. If <nAmount> is a negative number then the date is calculated backwards from <ClawDateTime>. The <Unit> parameter contains the units used in the calculation. The <Holidays> parameter contains the list of holidays used when calculating court hours and court days. If <Holidays> is NIL then no court holiday will be considered during the calculation process.

The kuCourtHours and kuCourtDays calculations skip days that are not normal court workdays. When calculating kuCourtHours, 1 hour is added or subtracted from the date and the date is checked to see if it falls on a weekend or court holiday. If it does, the date is adjusted forward or backward (according to the sign of the integer value in <amount>) until the date falls on a court workday and then continues with the 1 hour adjustments. The calculation continues in this fashion until the target date is reached. In the case where a court hour calculation crossing a day that is not a court workday, the time for the date final calculated date must be cleared.

TABLE 19

```
Function ClawDateCalculation(const ClawDateTime: TClawDateTime;
const nAmount: integer; const Unit: TClawUnit; Holidays: THolidays):
TClawDateTime;
    Declare d1 as TClawDateTime;
    Set d1 to <ClawDateTime>;
    Case <Unit>
        kuHours:
            Set d1 = add <nAmount> hours to d1;
        kuCourtHours;
            Set d1 to the result of ClawCalcCourtHours(d1,
                <nAmount>, Holidays);
        kuDays:
            Set d1 = add <nAmount> days to d1;
        kuCourtDays:
            Set d1 to the result of ClawCalcCourtDays(d1, <nAmount>,
                Holidays);
        kuWeeks:
            Set d1 = add <nAmount> weeks to d1;
        kuMonths:
            Set d1 = add <nAmount> months to d1;
        kuYears
            Set d1 = add <nAmount> years to d1;
    EndCase
    Return d1 to the caller;
```

Referring again to FIG. 1, a DCE 102 performs court date calculations based on court rules stored in a court rule database 104. The DCE includes a date calculation script interpreter 103 that processes DCSL.

Figure 20:
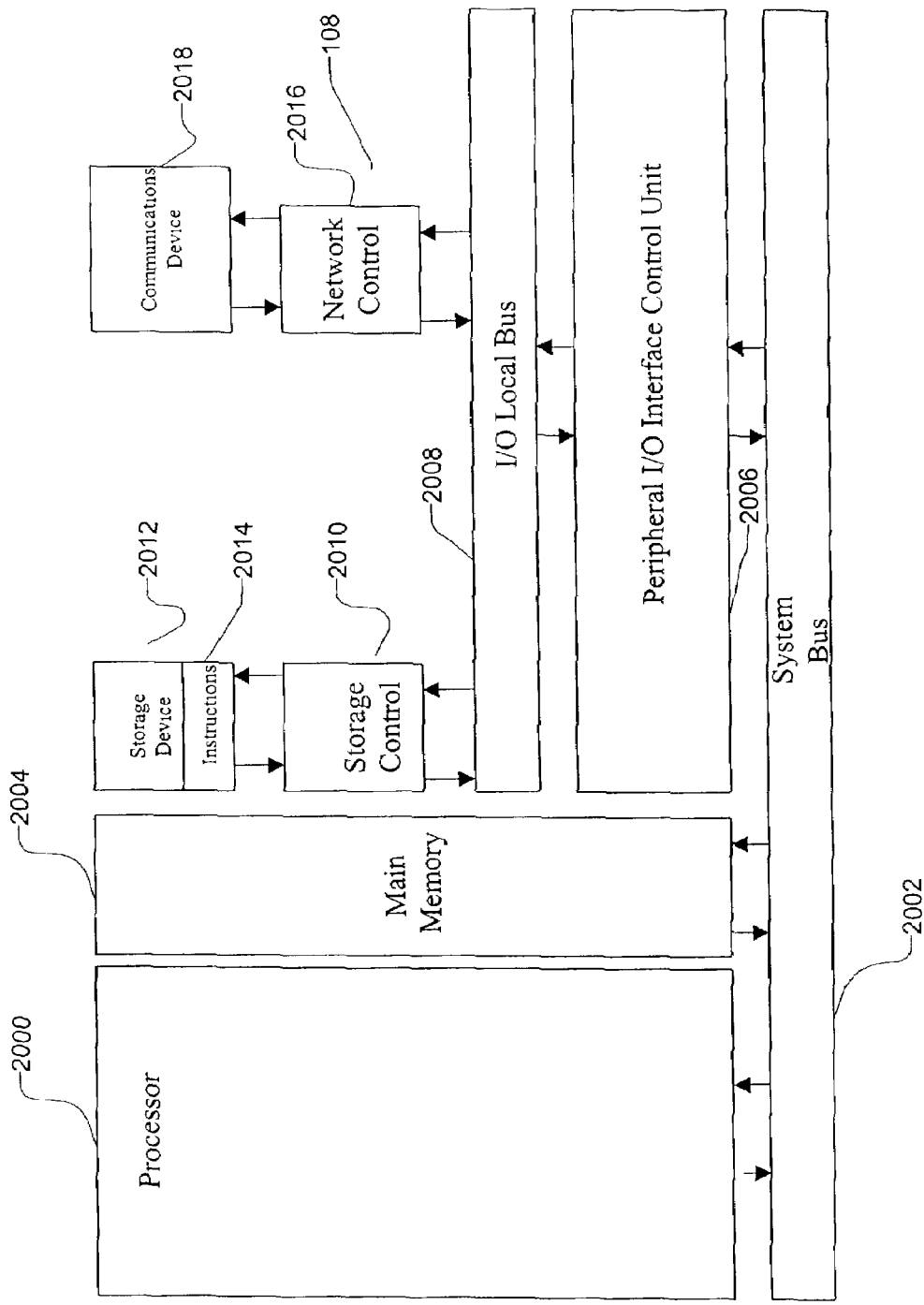
FIG. 20 is a diagram of a an embodiment of a computer suitable for use as a host for a court calender generation server in accordance with an exemplary embodiment of the present invention.

FIG. 20 is a hardware architecture diagram of a general purpose computer suitable for use as a court date server host. A processor 2000 is coupled via a system bus 2002 to a main memory 2004 and an I/O control unit 2006. The I/O control unit is coupled via an I/O local bus 2008 to a storage controller 2010, and a network controller 2016.

The storage controller is coupled to a storage device 2012. Computer program instructions 2014 implementing a court date server are stored on the storage device until the processor retrieves the computer program instructions and stores them in the main memory. The processor then executes the computer program instructions stored in the main memory to implement the features of a court date server.

The network controller is operatively coupled to communications device 2018. The communications device is adapted to allow a court date server hosted by the general purpose computer to communicate via a computer network such as the Internet with other software objects on the computer network such as a user client.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A method for generating and transmitting a calendar of different legal events capable of occurring in the course of a legal proceeding by a server coupled to a user client over a wide area network, the method comprising:

providing a database coupled to the server, the database storing a formulas table for at least one rule set applicable to at least one court jurisdiction, the formulas table for the at least one rule set including identification of a plurality of trigger events and a plurality of formulas for calculating a set of event dates, the plurality of formulas being implemented via computer implemented date calculation instructions, the database further including a predefined relationship table including one or more entries for each of the plurality of formulas, each of the entries having a formula field containing a formula ID of the formula being represented, each of the entries further having a relationship field containing a trigger ID uniquely identifying a trigger event which directly or indirectly affects calculation of an event date via the represented formula, wherein the trigger ID contained in the relationship field of two or more of the entries of the relationship table representing two or more of the formulas, are the same;

identifying by the server the at least one rule set applicable to the at least one court jurisdiction;

receiving by the server from the user client via the wide area network a trigger date for a particular one of the plurality of trigger events in the identified rule set, wherein the particular trigger event for which the trigger date is received is uniquely identified by a particular trigger ID;

identifying by the server a plurality of interrelated formulas triggered by the particular trigger event, wherein the identifying includes:

querying the relationship table by the server for the particular trigger ID and identifying a plurality of entries in the relationship table representing the plurality of interrelated formulas, each of the plurality of identified entries containing said particular trigger ID in the relationship field, wherein at least one of the plurality of interrelated formulas represented via one of the identified entries containing said particular trigger ID in the relationship field is configured to calculate an event date of a particular legal event that indirectly depends on the received trigger date and thereby does not directly utilize the received trigger date in calculating the event date;

retrieving by the server from each of the identified plurality of entries in the relationship table containing the particular trigger ID, a particular formula ID identifying the corresponding formula; and retrieving by the server from the formulas table the date calculation instructions for each of the identified formulas based on the retrieved formula ID;

calculating by the server a set of interrelated event dates based on the trigger date and the retrieved date calculation instructions;

transmitting by the server the calculated event dates to the user client over the wide area network;

providing a database coupled to a computer device, the database including user data for a user; and putting the calculated event dates by the computer device into the database associated with the user data.

2. The method of claim 1 wherein the user data further includes a user electronic mail address for the user, the method further comprising:

getting the calculated event dates by the server from the database;

getting the user electronic mail address by the server from the database;

generating one or more reminder electronic mail messages by the server based on the calculated event dates; and transmitting the one or more reminder electronic mail messages by the server to the user via the wide area network using the user electronic mail address.

3. The method of claim 2, further comprising:

including a reminder response link in the reminder electronic mail message; and receiving a user reminder response by the server from the user using the reminder response link.

4. The method of claim 1 further comprising:

receiving an updated formula by the server; and automatically updating one of the calculated event dates by the server based on the updated formula.

5. The method of claim 4, further comprising:

transmitting an electronic mail message associated with the updated event date;

including a notification response link in the notification electronic mail message; and receiving a user notification response by the server from the user using the notification response link.

6. The method of claim 1 further comprising:

receiving user billing data for a user by the server from the user client via the wide area network;

generating an event generation charges document;

transmitting the event generation charges document by the server to the user client via the wide area network;

receiving a user acceptance in response to the event generation charges document by the server from the user client via the wide area network;

generating an event date list by the server using the calculated event dates; and transmitting the event date list by the server to the user client via the wide area network.

7. The method of claim 6 further comprising charging the user for the calculated event dates using the user billing information.

8. The method of claim 1, further comprising:

receiving user billing data for a user by the server from the user client via the wide area network;

generating an event generation charges document including a proposed charge to the user for storing the calculated event dates;

transmitting the event generation charges document by the server to the user client via the wide area network;

receiving a user acceptance in response to the event generation charges document by the server from the user client via the wide area network;

generating an event date list by the server using the calculated event dates; and transmitting the event date list by the server to the user client via the wide area network.

9. The method of claim 8 further comprising charging the user for storing the calculated event dates using the user billing information.

10. The method of claim 4 further comprising:

prompting user acceptance of a charge amount for generating the updated event date, wherein the updated event date is transmitted in response to the user acceptance of the charge amount.

11. The method of claim 1 further comprising charging a user of the user client for generating the calendar of events including the calculated event dates.

12. The method of claim 11 further comprising:

prompting user acceptance of a charge amount for generating the calendar of legal events, wherein the calendar is transmitted in response to a user acceptance of the charge amount.

13. The method of claim 1, wherein the calculating includes counting only court days for the calculation of one or more of the event dates if the retrieved date calculation instructions specify a first type of calculation unit, and only calendar days if the retrieved date calculation instructions specify a second type of calculation unit.

14. The method of claim 1, wherein at least two of the plurality of rule sets are applicable to the selected court jurisdiction, and the calculating includes calculating the event dates based on the at least two of the plurality of rule sets.

15. The method of claim 1, wherein each of the plurality of rule sets is associated with a separate holiday list, wherein at least one of the event dates calculated via the identified rule set is modified, without user intervention, if the at least one of the event dates falls on a date identified to be a holiday by the holiday list associated with the identified rule set.

16. The method of claim 1, wherein a first one of the calculated event dates is used to calculate an event date for the at least one of the plurality of interrelated formulas.

17. A server for generating and transmitting a calendar of different legal events capable of occurring in the course of a legal proceeding, the server coupled to a user client over a wide area network and further coupled to a database storing a formulas table for at least one rule set applicable to at least one court jurisdiction, the formulas table for the at least one rule set including identification of a plurality of trigger events and a plurality of formulas for calculating a set of event dates, the plurality of formulas being implemented via computer implemented date calculation instructions, the database further including a predefined relationship table including one or more entries for each of the plurality of formulas, each of the entries having a formula field containing a formula ID of the formula being represented, each of the entries further having a relationship field containing a trigger ID uniquely identifying a trigger event which directly or indirectly affects calculation of an event date via the represented formula, wherein the trigger ID contained in the relationship field of two or more of the entries of the relationship table representing two or more of the formulas, are the same, the server comprising:

a processor; and a data storage device coupled to the processor and having program instructions stored therein, the processor being operable to execute the program instructions, the program instructions including:

identifying the at least one rule set applicable to the at least one court jurisdiction;

receiving from the user client via the wide area network a trigger date for a particular one of the plurality of trigger events in the identified rule set, wherein the particular trigger event for which the trigger date is received is uniquely identified by a particular trigger ID;

identifying by the server a plurality of interrelated formulas triggered by the particular trigger event, wherein the identifying includes:

querying the relationship table for the particular trigger ID and identifying a plurality of entries in the relationship table representing the plurality of interrelated formulas, each of the plurality of identified entries containing said particular trigger ID in the relationship field, wherein at least one of the plurality of interrelated formulas represented via one of the identified entries containing said particular trigger ID in the relationship field is configured to calculate an event date of a particular legal event that indirectly depends on the received trigger date and thereby does not directly utilize the received trigger date in calculating the event date;

retrieving from each of the identified plurality of entries in the relationship table containing the particular trigger ID, a particular formula ID identifying the corresponding formula; and retrieving from the formulas table the date calculation instructions for each of the identified formulas based on the retrieved formula ID;

calculating by the server a set of event dates based on the trigger date and the retrieved date calculation instructions; and transmitting the calculated event dates to the user client over the wide area network; and a database in communication with the server, the database including user data for a user, the instructions further including putting the calculated event dates into the database associated with the user data.

18. The server of claim 17 wherein the user data further includes a user electronic mail address for the user, the instructions further including:

getting the calculated event dates by the server from the database;

getting the user electronic mail address by the server from the database;

generating one or more reminder electronic mail messages by the server based on the calculated event dates; and transmitting the one or more reminder electronic mail messages by the server to the user via the wide area network using the user electronic mail address.

19. The server of claim 18, the instructions further including:

including a reminder response link in the reminder electronic mail message; and receiving a user reminder response by the server from the user using the reminder response link.

20. The server of claim 17, the instructions further including:

receiving an updated formula by the server; and automatically updating one of the calculated event dates by the server based on the updated formula.

21. The server of claim 20, the instructions further including:

transmitting an electronic mail message associated with the updated event date;

including a notification response link in the notification electronic mail message; and receiving a user notification response by the server from the user using the notification response link.

22. The server of claim 17, the instructions further including:

receiving user billing data for a user by the server from the user client via the wide area network;

generating an event generation charges document;

transmitting the event generation charges document by the server to the user client via the wide area network;

receiving a user acceptance in response to the event generation charges document by the server from the user client via the wide area network;

generating an event date list by the server using the calculated event dates; and transmitting the event date list by the server to the user client via the wide area network.

23. The server of claim 22 further comprising charging the user for the calculated event dates using the user billing information.

24. The server of claim 17, the instructions further including:

receiving user billing data for a user by the server from the user client via the wide area network;

generating an event generation charges document including a proposed charge to the user for storing the calculated event dates;

transmitting the event generation charges document by the server to the user client via the wide area network;

receiving a user acceptance in response to the event generation charges document by the server from the user client via the wide area network;

generating an event date list by the server using the calculated event dates; and transmitting the event date list by the server to the user client via the wide area network.

25. The server of claim 24, the instructions further including charging the user for storing the calculated event dates using the user billing information.

* * * * *

UNITED STATES PATENT AND TRADEMARK OFFICE
CERTIFICATE OF CORRECTION

PATENT NO. : 7,668,863 B2 Page 1 of 1
APPLICATION NO. : 10/201598
DATED : February 23, 2010
INVENTOR(S) : Kalmick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this

Twenty-eighth Day of December, 2010

David J. Kappos
*Director of the United States Patent and Trademark Office*